US 7,663,520 B2

(12) United States Patent
Sugihara et al.

(10) Patent No.: US 7,663,520 B2
(45) Date of Patent: Feb. 16, 2010

(54) A/D CONVERSION APPARATUS

(75) Inventors: Yuji Sugihara, Osaka (JP); Hisashi Kikue, Kyoto (JP); Masaru Kohara, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/199,831

(22) Filed: Aug. 28, 2008

(65) Prior Publication Data

US 2009/0058702 A1 Mar. 5, 2009

(30) Foreign Application Priority Data

Aug. 29, 2007 (JP) .............................. 2007-223297

(51) Int. Cl.
*H03M 1/00* (2006.01)
(52) U.S. Cl. ..................... 341/141; 341/112; 341/116; 341/117; 341/142; 341/155
(58) Field of Classification Search .......... 341/110–117, 341/118, 120, 141, 142, 155
See application file for complete search history.

(56) References Cited

U.S. PATENT DOCUMENTS

| | | | |
|---|---|---|---|
| 4,562,545 A | 12/1985 | Hasegawa | |
| 5,349,351 A * | 9/1994 | Obara et al. | 341/141 |
| 6,356,216 B1 * | 3/2002 | Chen et al. | 341/118 |
| 6,486,809 B1 * | 11/2002 | Figoli | 341/141 |
| 6,933,867 B2 * | 8/2005 | Honda | 341/118 |
| 7,009,537 B2 * | 3/2006 | Kabune | 341/120 |
| 7,242,335 B2 * | 7/2007 | Rubin et al. | 341/141 |
| 7,400,283 B1 * | 7/2008 | Zhu | 341/141 |
| 7,474,240 B2 * | 1/2009 | Barrenscheen | 341/141 |
| 7,477,174 B2 * | 1/2009 | Onde | 341/111 |
| 2005/0040978 A1 * | 2/2005 | Morita et al. | 341/141 |
| 2005/0219103 A1 * | 10/2005 | Ogawa | 341/155 |
| 2008/0204289 A1 * | 8/2008 | Miettinen | 341/141 |
| 2008/0252243 A1 * | 10/2008 | Azuma | 318/400.17 |

FOREIGN PATENT DOCUMENTS

JP       2003-284374 A       10/2003

OTHER PUBLICATIONS

Texas Instruments, "TMS320LF/C240xA DSP Controllers Reference Guide—Systems and Peripherals," Literature No. SPRU357C, Revised May 2006.
English language Abstract of JP 2003-284374 A.

* cited by examiner

*Primary Examiner*—Linh V Nguyen
(74) *Attorney, Agent, or Firm*—Greenblum & Bernstein, P.L.C.

(57) ABSTRACT

An A/D conversion apparatus performs motor current detection in an A/D conversion period corresponding to two phases out of three phases of a sinusoidal drive motor, using reduced register resources while minimizing the number of A/D converters. The A/D conversion apparatus includes: a selection unit selecting one of a plurality of input channels; an A/D converter converting an analog signal from the selected input channel to a digital signal; a start register holding a start channel number of sequential conversion; an end register holding an end channel number of the sequential conversion; a prohibition information holding unit holding prohibition information indicating an input channel to be excluded from the sequential conversion; and a control unit causing the selection unit to select, in channel number order, input channels corresponding to channel numbers from the start channel number to the end channel number except the input channel indicated by the prohibition information.

10 Claims, 22 Drawing Sheets

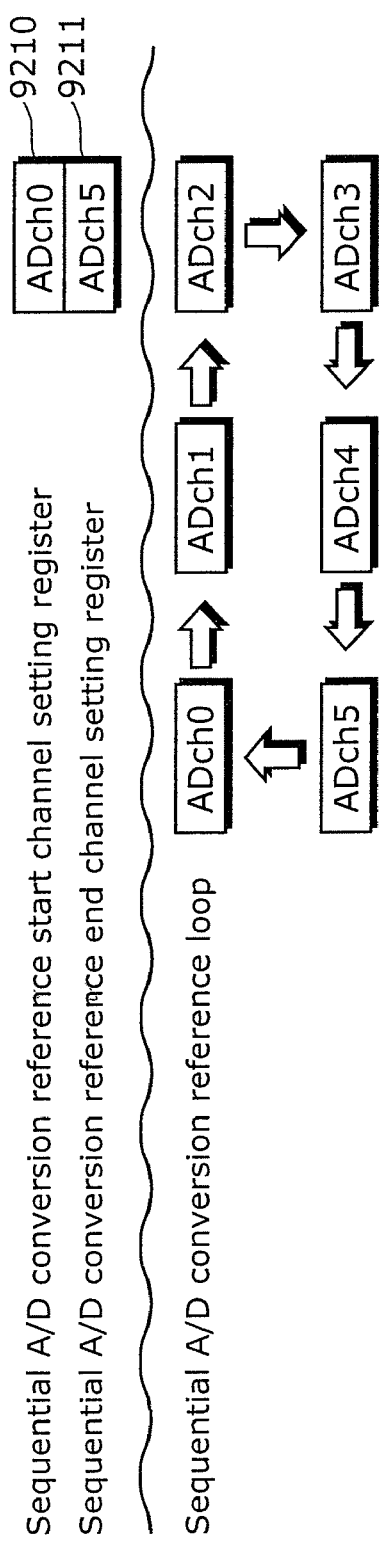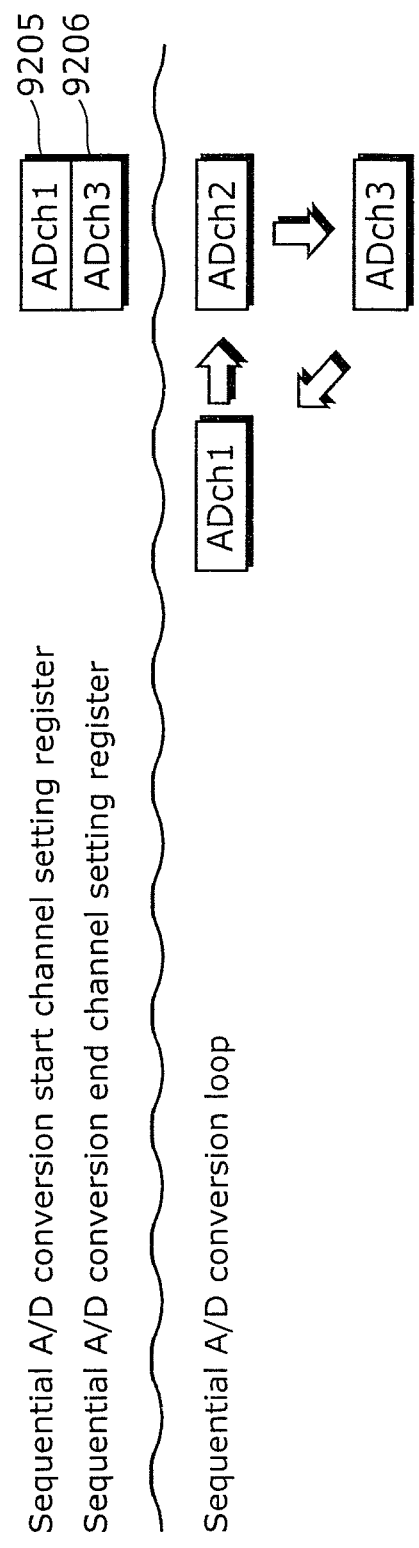
FIG. 4A
FIG. 4B

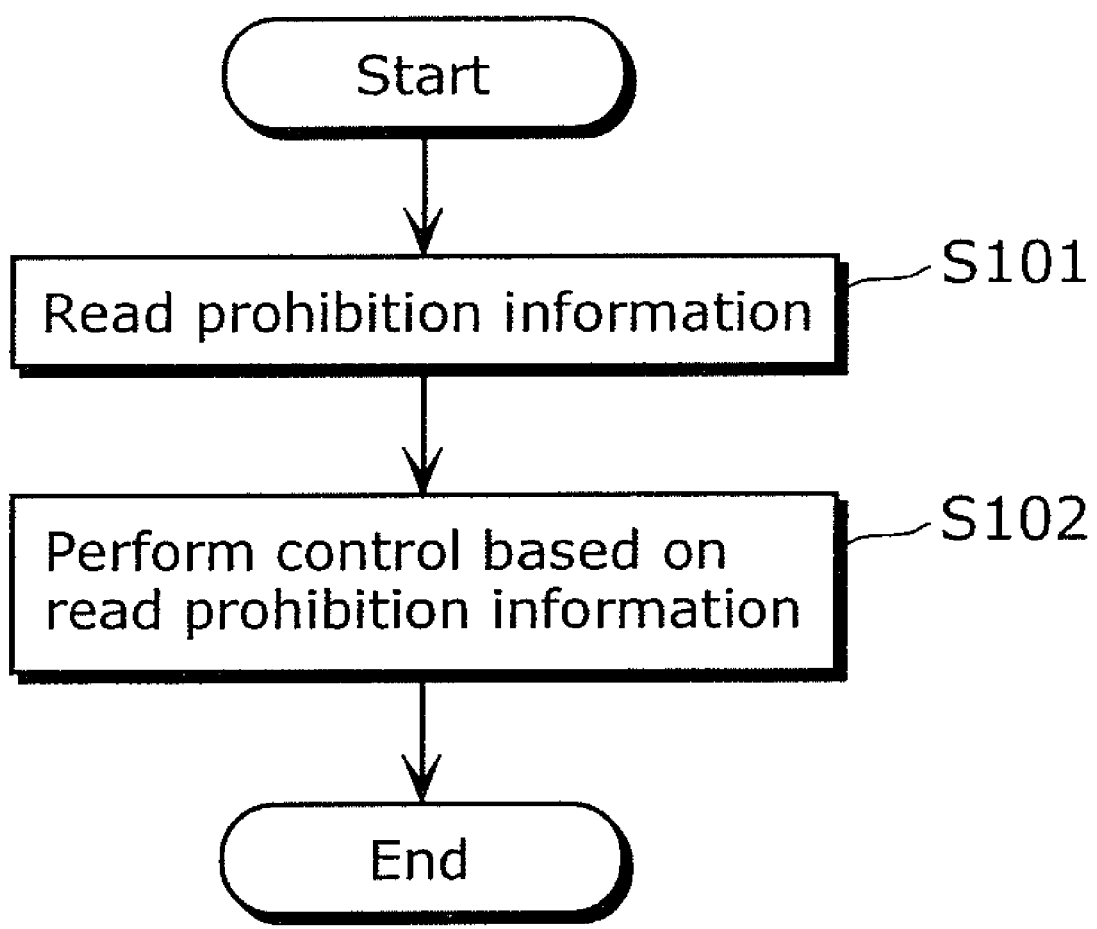

FIG. 18A
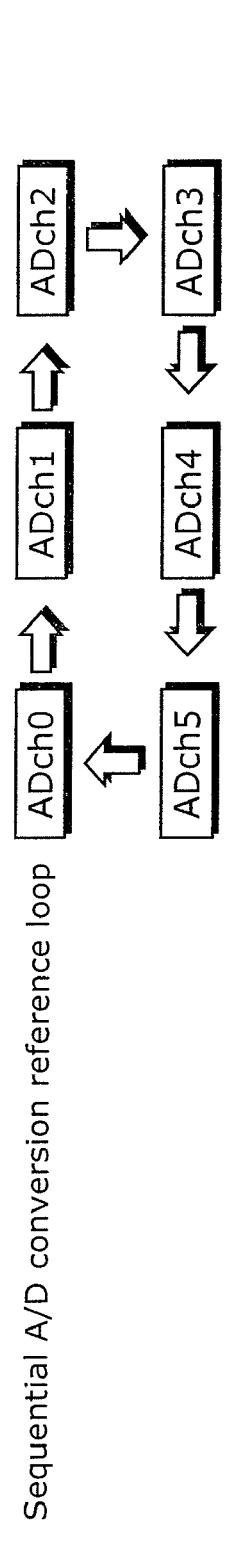
FIG. 18B
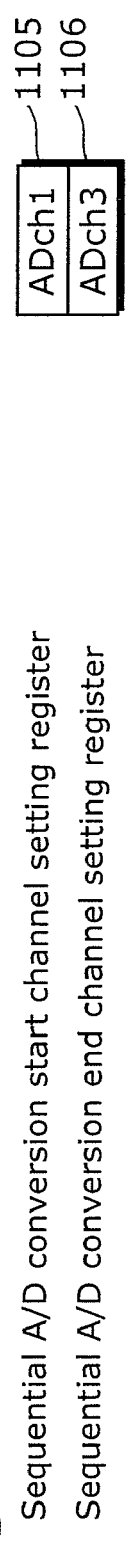
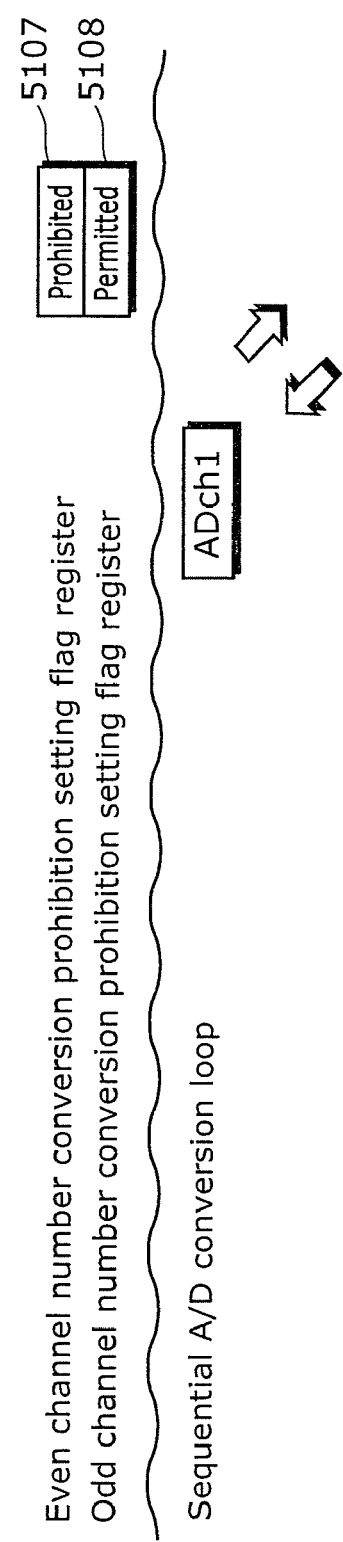

A/D CONVERSION APPARATUS

BACKGROUND OF THE INVENTION (1) Field of the Invention

The present invention relates to an A/D conversion apparatus, and especially relates to an A/D conversion apparatus that includes a plurality of channels and has a sequential conversion function.

(2) Description of the Related Art

With the development of inverter control technology in recent years, various motor drive control methods have been proposed.

For position sensorless control in the case of driving a sinusoidal motor, a method of providing a motor current sensor to thereby omit a position sensor for detecting a rotor position of the motor is conventionally known. In the position sensorless control, a voltage drop in the motor is calculated from a voltage applied to the motor, a motor current detected by the motor current sensor, and a motor constant, and a counter electromotive voltage is estimated from the calculated voltage drop. The rotor position is estimated based on the estimated counter electromotive voltage, and the motor is controlled accordingly.

Moreover, due to relatively high costs of motor current sensors, a motor current sensorless control technique that does not use a motor current sensor has been developed, too.

A feature of the motor current sensorless control technique is that a current value flowing through a DC shunt resistor which is conventionally provided for overcurrent protection of an inverter is used instead of a motor current value obtained from a motor current sensor.

In the motor current sensorless control technique, the current value flowing through the DC shunt resistor is amplified in a circuit other than an overcurrent detection circuit, and the amplified current value is taken in an A/D converter in a microcomputer, without involving an external circuit. After the amplified current value is taken in the microcomputer, an operation is performed according to a predetermined current-carrying pattern and rule, as a result of which a motor current is reproduced from the DC current flowing through the shunt resistor.

Against the backdrop of the demand for cost reductions of motor drive control apparatuses, motor current sensorless control has been increasingly adopted. One of the motor current sensorless control methods for sinusoidal motors is a three-shunt sensorless sinusoidal motor drive control method that detects three phases of a sinusoidal motor current using three shunt resistors.

The following describes the three-shunt sensorless sinusoidal motor drive control method, as an example motor current sensorless control technique that does not use a motor current sensor.

FIG. 1 is a block diagram showing a structure of a three-shunt sensorless sinusoidal motor drive control apparatus 900.

As shown in FIG. 1, the three-shunt sensorless sinusoidal motor drive control apparatus 900 includes a sinusoidal drive three-phase motor 905, a motor control power module 906, a motor control microcomputer 907, three shunt resistors 908, a motor current amplification circuit 909, and three A/D converters 911, 912, and 913.

A motor current for driving the sinusoidal drive three-phase motor 905 is controlled by changing ON/OFF states of switching elements included in the motor control power module 906 using a six-phase Pulse Width Modulation (PWM) signal outputted from the motor control microcomputer 907.

The motor current for driving the sinusoidal drive three-phase motor 905 is detected by amplifying currents flowing through the three shunt resistors 908 by the motor current amplification circuit 909, inputting the amplified currents into the motor control microcomputer 907, and converting the amplified currents inputted into the three A/D converters 911, 912, and 913 in the motor control microcomputer 907 from analog to digital.

The motor control microcomputer 907 controls the output of the six-phase PWM signal using the detected motor current.

By repeating the control operation as described above, the three-shunt sensorless sinusoidal motor drive control apparatus 900 creates a desired motor drive state.

FIG. 2 shows a PWM timer signal in the motor control microcomputer 907, a PWM signal output waveform of the motor control power module 906, and a timing section for obtaining the motor current.

As shown in FIG. 2, the motor current for driving the sinusoidal drive three-phase motor 905 can be correctly obtained in a section during which an upper arm of the PWM signal of the motor control power module 906 is OFF and a lower arm of the PWM signal of the motor control power module 906 is ON (this section is hereafter referred to as "motor current obtainment timing section"). Note here that when the lower arm of the PWM signal of the motor control power module 906 for driving the sinusoidal drive three-phase motor 905 is ON, the upper arm of the PWM signal of the motor control power module 906 is always OFF.

Since the three-shunt sensorless sinusoidal motor drive control apparatus 900 shown in FIG. 1 includes three A/D converters, the three phases of the motor current for driving the sinusoidal drive three-phase motor 905 can be obtained simultaneously. Therefore, a time required for obtaining these three phase motor currents for driving the sinusoidal drive three-phase motor 905 is only an A/D conversion period corresponding to one phase in a motor current obtainment timing section during which the lower arm of the PWM signal of the motor control power module 906 is ON.

However, the demand for cost reductions of motor drive control apparatuses is even more growing in recent years. In view of this, instead of assigning the plurality of A/D converters 911, 912, and 913 to one sinusoidal drive three-phase motor to perform motor current detection for three phases simultaneously in the above three-shunt sensorless sinusoidal motor drive control apparatus 900, the use of the following A/D conversion apparatus has been proposed. The A/D conversion apparatus assigns one A/D converter to one sinusoidal drive three-phase motor, and performs motor current detection for three phases sequentially, to thereby reduce in cost of the motor drive control apparatus (for example, "TMS320LF/LC240xA DSP Controllers Reference Guide", Literature Number: SPRU357C, Revised May 2006 (hereafter, "Non-patent Reference 1")).

The A/D conversion apparatus described in Non-patent Reference 1 includes a plurality of input/output channels, and has a sequential conversion function of sequentially performing A/D conversion in an order of numbers assigned to the plurality of input channels. This being so, by replacing the A/D converters 911, 912, and 913 in the three-shunt sensorless sinusoidal motor drive control apparatus 900 shown in FIG. 1 with one A/D conversion unit described in Non-patent Reference 1, motor current detection for three phases can be performed sequentially.

The following describes a three-shunt sensorless sinusoidal motor drive control apparatus that performs motor current detection for three phases sequentially in an A/D conversion unit having one A/D converter, with reference to drawings.

FIG. 3 is a block diagram showing a structure of an A/D conversion unit 920 that performs motor current detection for three phases sequentially. As shown in FIG. 3, the A/D conversion unit 920 includes a plurality of input channels ADch0 to ADch5, a multiplexer 9200, an A/D converter 9201, a demultiplexer 9202, a control unit 9203, and a register unit 9204.

The plurality of input channels ADch0 to ADch5 are each given a channel number. Hereafter, the channel numbers assigned to the plurality of input channels ADch0 to ADch5 are respectively denoted by ADch0 to ADch5, for ease of explanation. At least two input channels out of the plurality of input channels ADch0 to ADch5 receive input of analog signals obtained by amplifying current values detected in the shunt resistors 908, and output the analog signals to the multiplexer 9200.

The multiplexer 9200 selects one of the plurality of input channels ADch0 to ADch5, and outputs an analog input signal from the selected input channel to the A/D converter 9201.

The A/D converter 9201 converts the analog signal from the input channel selected by the multiplexer 9200 to a digital signal, and outputs the digital signal to the demultiplexer 9202.

The demultiplexer 9202 selects one of a plurality of output registers, and outputs the digital signal generated as a result of the conversion by the A/D converter 9201, to the selected output register.

The control unit 9203 controls the multiplexer 9200, the A/D converter 9201, and the demultiplexer 9202. The control unit 9203 causes the multiplexer 9200 to select one of the plurality of input channels ADch0 to ADch5, and output an analog signal to the A/D converter 9201. The control unit 9203 causes the A/D converter 9201 to convert the analog signal from the input channel selected by the multiplexer 9200 to a digital signal, and output the digital signal to the demultiplexer 9202. The control unit 9203 causes the demultiplexer 9202 to select one of the plurality of output registers, and output the digital signal received from the A/D converter 9201 to the selected output register.

The register unit 9204 includes a sequential A/D conversion start channel setting register 9205 and a sequential A/D conversion end channel setting register 9206. The register unit 9204 also includes a sequential A/D conversion reference start channel setting register 9210 and a sequential A/D conversion reference end channel setting register 9211, which are used for determining an order and range (hereafter referred to as "sequential A/D conversion reference loop") of channel numbers of input channels that can be selected by the multiplexer 9200.

On the other hand, the sequential A/D conversion start channel setting register 9205 and the sequential A/D conversion end channel setting register 9206 are used for determining a range of channel numbers of input channels that are to be selected by the multiplexer 9200 in the order of channel numbers of the sequential A/D conversion reference loop. That is, a sequential A/D conversion loop of input channels to be selected by the multiplexer 9200 is determined as "sequential A/D conversion start channel→ ... →sequential A/D conversion end channel→sequential A/D conversion start channel→ ... ".

Input channels of channel numbers from a channel number, such as ADch1, set in the sequential A/D conversion start channel setting register 9205 to a channel number, such as ADch3, set in the sequential A/D conversion end channel setting register 9206 are selected by the multiplexer 9200 in an order of the channel numbers, and analog signals inputted into the selected input channels are outputted to the multiplexer 9200.

FIGS. 4A and 4B are explanatory views showing a sequential conversion operation of sequentially performing A/D conversion in the A/D conversion unit 920.

FIG. 4A shows a sequential A/D conversion reference loop defining an order and range of channel numbers of input channels that can be selected by the multiplexer 9200, in the case when the sequential A/D conversion reference start channel setting register 9210 is set to the channel number ADch0 and the sequential A/D conversion reference end channel setting register 9211 is set to the channel number ADch5.

As shown in FIG. 4A, the sequential A/D conversion reference loop (ADch0→ADch1→ADch2→ADch3→ADch4→ADch5→ ... ) that starts with the channel number ADch0 and ends with the channel number ADch5 is determined according to the settings of the sequential A/D conversion reference start channel setting register 9210 and the sequential A/D conversion reference end channel setting register 9211.

This indicates that the A/D conversion unit 920 sequentially performs conversion in increasing order of channel number.

FIG. 4B shows a sequential conversion operation of sequentially performing A/D conversion in the A/D conversion unit 920, in the case when the sequential A/D conversion start channel setting register 9205 is set to the channel number ADch1 and the sequential A/D conversion end channel setting register 9206 is set to the channel number ADch3.

Since the A/D conversion unit 920 sequentially performs A/D conversion in increasing order of channel number, a sequential A/D conversion loop (ADch1→ADch2→ADch3→ADch1→ ... ) that starts with the channel number ADch1 and ends with the channel number ADch3 is determined according to the settings of the sequential A/D conversion start channel setting register 9205 and the sequential A/D conversion end channel setting register 9206.

In the three-shunt sensorless sinusoidal motor drive control apparatus 900 that performs motor current detection for three phases sequentially in the above A/D conversion unit 920 having one A/D converter 9201, the three phase motor currents detected by the shunt resistors 908 are amplified and the amplified current values are inputted into the A/D conversion unit 920 as analog input signals. It is assumed here that the analog input signals are inputted into the input channels ADch1, ADch2, and ADch3 in the A/D conversion unit 920.

In the A/D conversion unit 920, the three phase motor currents for driving the sinusoidal drive three-phase motor 905 can be correctly obtained through the sequential conversion of the three input channels ADch1, ADch2, and ADch3, in accordance with the above setting shown in FIGS. 4A and 4B.

In other words, by using an A/D conversion apparatus that includes a plurality of channels and has a sequential conversion function, motor current detection for three phases can be performed sequentially with one A/D converter.

However, in the case of performing motor current detection for three phases sequentially using one A/D converter, it takes three times as long as in the case of performing motor current detection using three A/D converters. Which is to say, in the case when three A/D converters are provided, the time required for obtaining the three phase motor currents for driving the sinusoidal drive three-phase motor 905 is only an A/D conversion period corresponding to one phase in a motor current obtainment timing section during which the lower arm of the PWM signal of the motor control power module 906 is ON. On the other hand, in the case when motor current detection for three phases is performed sequentially using one A/D converter, the time required for obtaining the three phase motor currents is an A/D conversion period corresponding to three phases in a motor current obtainment timing section during which the lower arm of the PWM signal of the motor control power module 906 is ON.

In view of this, based on a known relation that one of the three phase motor currents for driving the sinusoidal drive three-phase motor 905 can be calculated from the other two phase motor currents, a motor control apparatus that uses a two-phase selection control method of detecting two phase motor currents from the shunt resistors 908 to thereby obtain the three phase motor currents has been proposed (see Japanese Unexamined Patent Application Publication No. 2003-284374 (hereafter, "Patent Reference 1")).

As noted above, in the three-shunt sensorless sinusoidal motor drive control apparatus 900 provided with an A/D conversion unit that includes a plurality of channels and has a sequential conversion function, an A/D conversion period corresponding to three phases in a section during which the lower arm of the PWM signal of the motor control power module 906 is ON is necessary in order to perform motor current detection for three phases sequentially in the A/D conversion unit 920 in the motor control microcomputer 907. However, by applying the two-phase selection control method of Patent Reference 1 to motor current detection, the three phase motor currents can be obtained from the two phase motor currents. This enables the three-shunt sensorless sinusoidal motor drive control apparatus 900 provided with an A/D conversion unit that includes a plurality of channels and has a sequential conversion function, to perform motor current detection in an A/D conversion period corresponding to two phases in a section during which the lower arm of the PWM signal of the motor control power module 906 is ON.

However, in the conventional A/D conversion unit that includes a plurality of channels and has a sequential conversion function as shown in FIG. 3, a plurality of analog signals inputted into a plurality of input channels are sequentially converted in channel number order. Therefore, even when the two-phase selection control method of Patent Reference 1 is applied to motor current detection, the two phases for obtaining the correct motor currents need to correspond to adjacent channel numbers, so that it is impossible to arbitrarily select two out of the three consecutive phases to perform A/D conversion. That is, motor current detection cannot be performed within an A/D conversion period corresponding to two phases in a section during which the lower arm of the PWM signal of the motor control power module 906 is ON, but requires an A/D conversion period corresponding to three phases.

This is described in more detail below.

In the three-shunt sensorless sinusoidal motor drive control apparatus 900 that performs motor current detection for three phases sequentially in the A/D conversion unit 920 having one A/D converter 9201 by using the two-phase selection control method of Patent Document 1, the three phase motor currents detected in the shunt resistors 908 are amplified and the amplified motor current values are inputted into the A/D conversion unit 920 as analog input signals.

It is assumed here that the analog input signals are inputted into the input channels ADch1, ADch2, and ADch3 in the A/D conversion unit 920, with the input channels ADch1 and ADch3 corresponding to the two phases for obtaining the correct current values.

In theory, the A/D conversion unit 920 can correctly obtain the three phase motor currents for driving the sinusoidal drive three-phase motor 905, by performing A/D conversion of only the two input channels ADch1 and ADch3. However, the sequential A/D conversion loop in the register unit 9204 in the A/D conversion unit 920 needs to be set as "ADch1→ADch2→ADch3 → . . . " with ADch2 being included between ADch1 and ADch3. Therefore, even when the two-phase selection control method of Patent Reference 1 is used, a time for performing A/D conversion of an analog current value from the input channel ADch2 is necessary. Hence an A/D conversion period corresponding to three phases in a motor current obtainment timing section during which the lower arm of the PWM signal of the motor control power module 906 is ON is required, as in the case of performing motor current detection for three phases sequentially using one A/D converter. That is, the three phase motor currents cannot be detected within an A/D conversion period corresponding to two phases in a section during which the lower arm of the PWM signal of the motor control power module 906 is ON.

For example, when an A/D conversion period corresponding to one phase in the A/D converter 9201 in the A/D conversion unit 920 is 1 µs, an A/D conversion period of 3 µs is required in the A/D converter 9201 so that the motor control microcomputer 907 obtains the motor current values.

To address this, a method of providing, in the A/D conversion unit having the A/D converter described in Non-patent Reference 1, an array register for designating a channel that is subject to A/D conversion has been proposed.

In detail, a plurality of array registers are provided in the register unit 9204 in the A/D conversion unit 920 having the A/D converter described in Non-patent Reference 1. Each array register stores information designating any of the input channels ADch0 to ADch5. The control unit 9203 controls the multiplexer 9200, the A/D converter 9201, and the demultiplexer 9202 so that A/D conversion is sequentially performed on analog signals from the input channels ADch0 to ADch5 in order of addresses of the array registers. Thus, by providing the array registers in the register unit 9204 in the A/D conversion unit 920, the order in which the input channels ADch0 to ADch5 are submitted to A/D conversion can be set freely.

As described above, according to the sequential A/D conversion method using array registers, it is possible to select only the two phases for obtaining the correct current values and perform sequential A/D conversion in the two-phase selection control method.

Therefore, by employing the two-phase selection control method and the sequential A/D conversion method that uses array registers, the three-shunt sensorless sinusoidal motor drive control apparatus 900 provided with an A/D conversion unit that includes a plurality of channels and has a sequential conversion function can detect the three phase motor currents for driving the sinusoidal drive three-phase motor 905, in an A/D conversion period corresponding to two phases in a section during which the lower arm of the PWM signal of the motor control power module 906 is ON.

However, in the sequential A/D conversion method using array registers, the same number of array registers as the number of all input channels that can be subject to A/D conversion need to be provided in the register unit 9204 in the A/D conversion unit 920. This consumes a lot of register resources. For instance, when the number of all input channels that can be subject to A/D conversion is 16, register resources of 16×4 bits are necessary. This causes an increase in chip area of the motor control microcomputer 907, resulting in an increase in cost of the motor control microcomputer 907.

SUMMARY OF THE INVENTION

The present invention has been developed to solve the above problems. An object of the present invention is to realize an A/D conversion apparatus that can perform motor current detection in an A/D conversion period corresponding to two phases out of three phases of a sinusoidal drive motor, using reduced register resources to achieve a lower cost while minimizing the number of A/D converters.

The stated object can be achieved by an analog-to-digital (A/D) conversion apparatus that has a plurality of analog input channels, and sequentially converts analog signals inputted into the plurality of analog input channels to digital signals in channel number order of a plurality of channel numbers respectively assigned to the plurality of analog input channels, the A/D conversion apparatus including: a selection unit that selects one of the plurality of analog input channels; an A/D converter that converts an analog signal inputted into the analog input channel selected by the selection unit, to a digital signal; a start register that holds a start channel number which is a channel number of a start analog input channel of the sequential conversion; an end register that holds an end channel number which is a channel number of an end analog input channel of the sequential conversion; a prohibition information holding unit that holds prohibition information indicating an analog input channel that is to be excluded from the sequential conversion; and a control unit that causes the selection unit to select, in the channel number order, analog input channels corresponding to channel numbers from the start channel number to the end channel number except the analog input channel indicated by the prohibition information held in the prohibition information holding unit.

Here, the prohibition information holding unit may include a flag register that holds a flag indicating either prohibition or permission for each of the plurality of channel numbers, as the prohibition information.

Moreover, the control unit may start the sequential conversion in response to each of a plurality of trigger signals, wherein the prohibition information holding unit includes a plurality of flag registers corresponding to the plurality of trigger signals, each of the plurality of flag registers holds a flag indicating either prohibition or permission for each of the plurality of channel numbers, as the prohibition information, and the control unit, when one of the plurality of trigger signals is inputted, causes the selection unit to select, in the channel number order, analog input channels corresponding to channel numbers from the start channel number to the end channel number except an analog input channel indicated by the prohibition information held in a flag register corresponding to the inputted trigger signal.

Moreover, the prohibition information holding unit may include a flag register that holds a flag indicating either prohibition or permission for all channel numbers other than the start channel number and the end channel number, as the prohibition information.

Moreover, the prohibition information holding unit may include a prohibition register that holds a channel number of the analog input channel that is to be excluded from the sequential conversion, as the prohibition information.

Moreover, the prohibition register may hold only one channel number, wherein the prohibition information holding unit includes only one prohibition register.

Moreover, the prohibition information holding unit may include: an even channel prohibition register that holds a flag indicating either prohibition or permission for even channel numbers of the plurality of channel numbers, as the prohibition information; and an odd channel prohibition register that holds a flag indicating either prohibition or permission for odd channel numbers of the plurality of channel numbers, as the prohibition information, wherein the control unit causes the selection unit to select, in the channel number order: analog input channels corresponding to channel numbers from the start channel number to the end channel number except each analog input channel whose channel number is even, when the flag held in the even channel prohibition register indicates prohibition; and analog input channels corresponding to channel numbers from the start channel number to the end channel number except each analog input channel whose channel number is odd, when the flag held in the odd channel prohibition register indicates prohibition.

Moreover, the prohibition information holding unit may include a start and end channel register that holds a first channel number and a second channel number as the prohibition information, the first channel number and the second channel number respectively being a channel number of a start analog input channel and a channel number of an end analog input channel of another sequential conversion, wherein the control unit causes the selection unit to select, in the channel number order, analog input channels corresponding to channel numbers from the start channel number to the end channel number, except each analog input channel whose channel number is not designated in the other sequential conversion from the first channel number to the second channel number held in the start and end channel register.

According to these structures, in an A/D conversion apparatus that performs motor current detection in an A/D conversion period corresponding to two phases out of three phases of a sinusoidal drive motor, instead of setting a sequential A/D conversion order by the conventional sequential A/D conversion method using array registers, a means of excluding a predetermined input channel from sequential A/D conversion is applied to the conventional sequential A/D conversion method of sequentially converting a plurality of analog inputs in channel number order. This makes it possible to realize an A/D conversion apparatus that can reduce register resources to achieve a lower cost while minimizing the number of A/D converters.

Moreover, a washing machine may include: a motor that controls a washing tub; and a microcomputer that controls the motor, wherein the microcomputer includes the above A/D conversion apparatus, estimates a rotor position of the motor from an analog signal obtained in the A/D conversion apparatus, and controls the motor according to the estimated rotor position.

It should be noted that the present invention can be realized not only as an apparatus, but also as an integrated circuit including the processing units included in the apparatus, a method including steps corresponding to the processing units included in the apparatus, and a program for causing a computer to execute these steps.

According to the present invention, an A/D conversion apparatus that can reduce register resources to achieve a lower cost while minimizing the number of A/D converters can be realized.

FURTHER INFORMATION ABOUT TECHNICAL BACKGROUND TO THIS APPLICATION

The disclosure of Japanese Patent Application No. 2007-223297 filed on Aug. 29, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIGS. 4A and 4B are explanatory views showing a sequential conversion operation of sequentially performing A/D conversion in the A/D conversion unit shown in FIG. 3;

FIG. 9 shows a procedure of sequential A/D conversion in the A/D conversion unit in the first embodiment of the present invention;

FIGS. 18A and 18B are explanatory views showing a sequential conversion operation of sequentially performing A/D conversion in the A/D conversion unit in the fifth embodiment of the present invention;

DESCRIPTION OF THE PREFERRED EMBODIMENT(S)

First Embodiment

A first embodiment of the present invention is described below, with reference to drawings.

Figure 1:
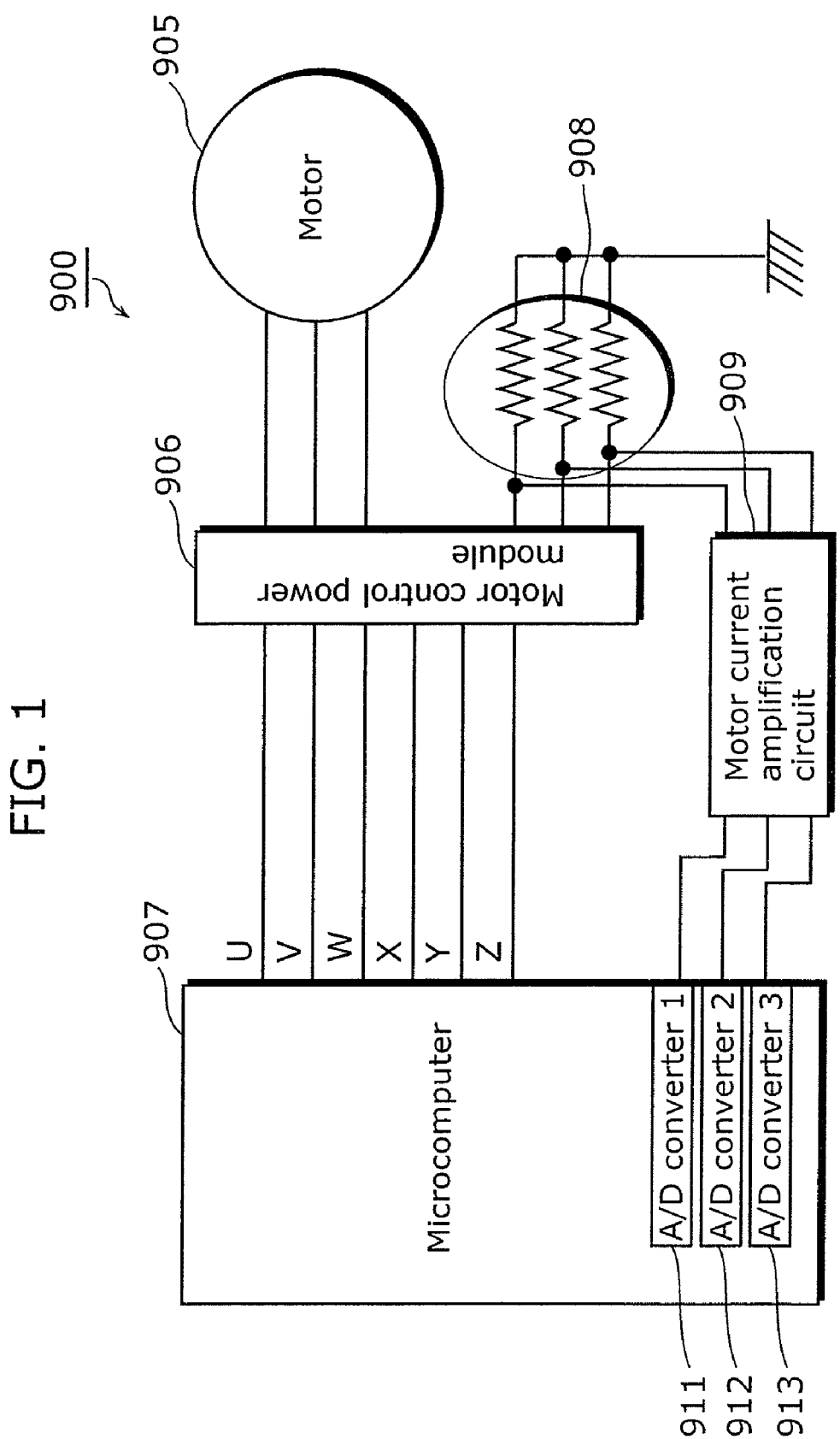
FIG. 1 is a block diagram showing a structure of a conventional three-shunt sensorless sinusoidal motor drive control apparatus.
Figure 2:
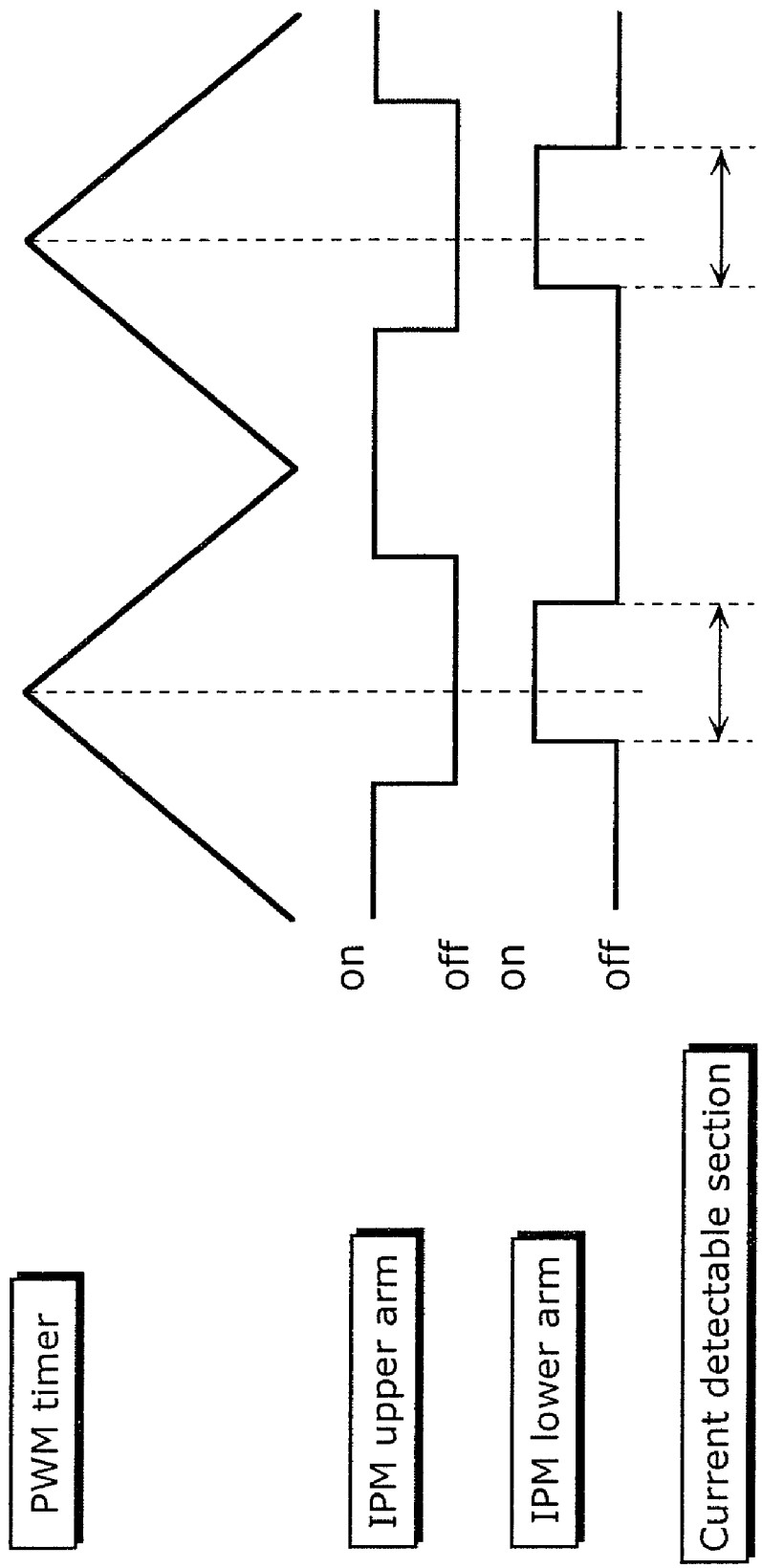
FIG. 2 shows a PWM timer signal in a motor control microcomputer, a PWM signal output waveform of a motor control power module, and a motor current obtainment timing section.
Figure 3:
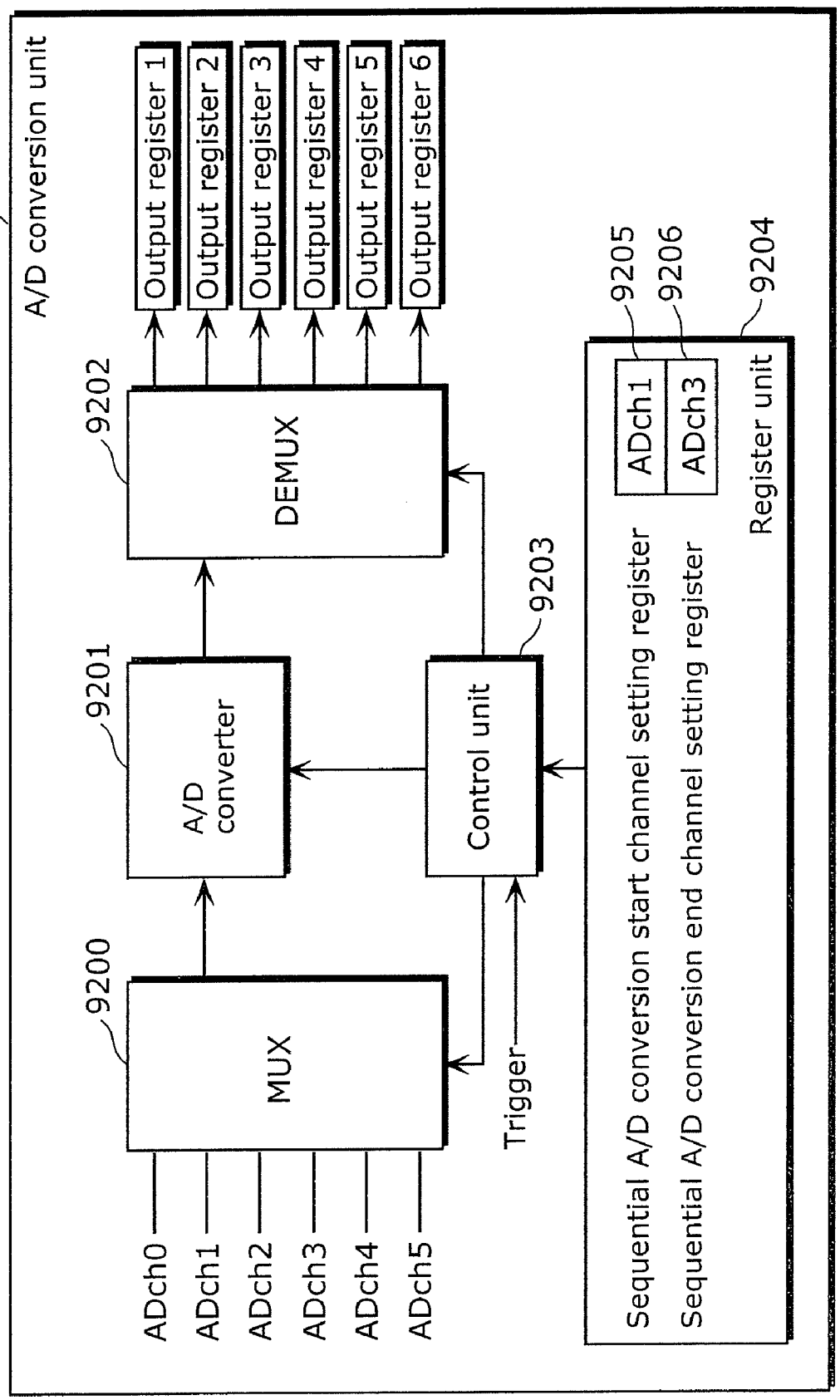
FIG. 3 is a block diagram showing a structure of an A/D conversion unit that performs motor current detection for three phases sequentially.
Figure 5:
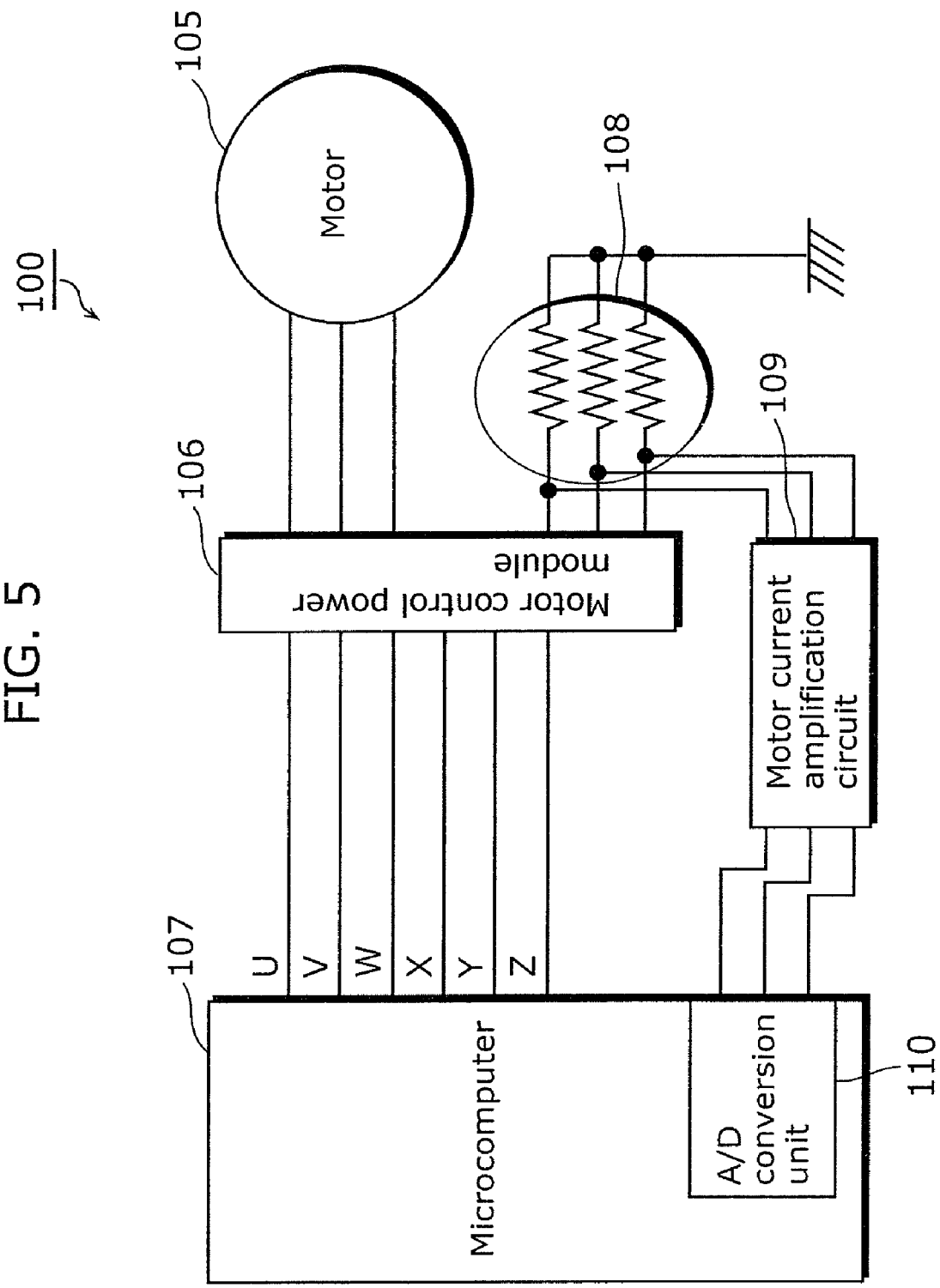
FIG. 5 is a block diagram showing a structure of a three-shunt sensorless sinusoidal motor drive control apparatus in a first embodiment of the present invention.

FIG. 5 is a block diagram showing a structure of a three-shunt sensorless sinusoidal motor drive control apparatus 100 in the first embodiment of the present invention.

As shown in FIG. 5, the three-shunt sensorless sinusoidal motor drive control apparatus 100 includes a sinusoidal drive three-phase motor 105, a motor control power module 106, a motor control microcomputer 107, three shunt resistors 108, a motor current amplification circuit 109, and an A/D conversion unit 110.

In the three-shunt sensorless sinusoidal motor drive control apparatus 100, a motor current for driving the sinusoidal drive three-phase motor 105 is controlled by changing ON/OFF states of switching elements included in the motor control power module 106 according to a six-phase PWM signal outputted from the motor control microcomputer 107. The motor current for driving the sinusoidal drive three-phase motor 105 is detected by amplifying currents flowing through the three shunt resistors 108 by the motor current amplification circuit 109, inputting the amplified currents into the motor control microcomputer 107, and converting the amplified currents inputted into the A/D conversion unit 110 in the motor control microcomputer 107 from analog to digital.

The motor control microcomputer 107 controls the output of the six-phase PWM signal, using the detected motor current. In detail, the motor control microcomputer 107 estimates a motor position (speed) of the sinusoidal drive three-phase motor 105 from the detected motor current and, based on the estimated motor position of the sinusoidal drive three-phase motor 105 and a target speed, outputs the PWM signal in six phases (three phases as PWM) for controlling the sinusoidal drive three-phase motor 105 so that its motor current is sinusoidal. In this way, the sinusoidal drive three-phase motor 105 is controlled.

By repeating the control operation as described above, the three-shunt sensorless sinusoidal motor drive control apparatus 100 in the first embodiment creates a desired motor drive state.

Figure 6:
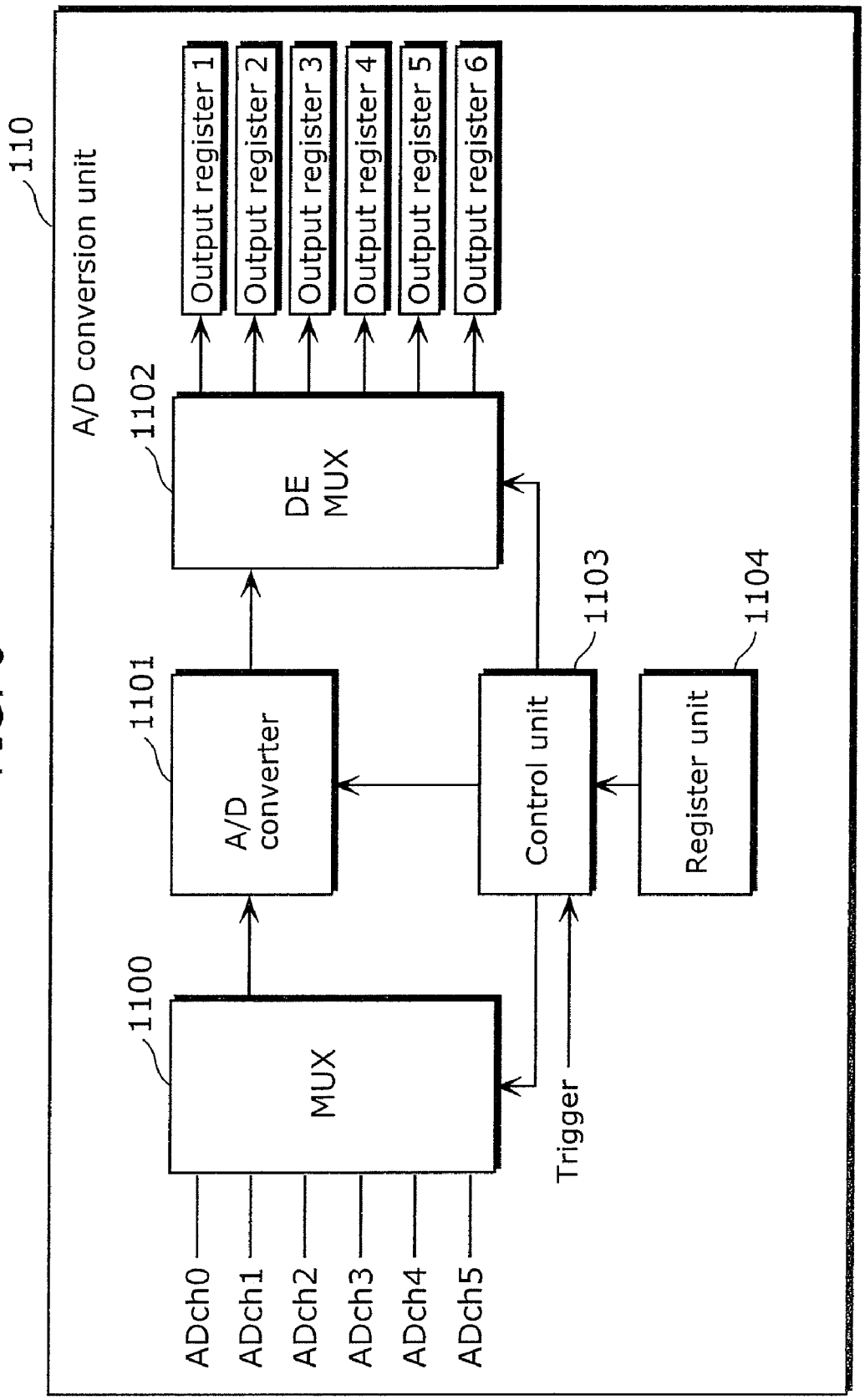
FIG. 6 is a block diagram showing a structure of an A/D conversion unit in the three-shunt sensorless sinusoidal motor drive control apparatus in the first embodiment of the present invention.

FIG. 6 is a block diagram showing a structure of the A/D conversion unit 110 in the three-shunt sensorless sinusoidal motor drive control apparatus 100 in the first embodiment. As shown in FIG. 6, the A/D conversion unit 110 includes a plurality of input channels ADch0 to ADch5, a multiplexer 1100, an A/D converter 1101, a demultiplexer 1102, a control unit 1103, and a register unit 1104.

The plurality of input channels ADch0 to ADch5 are each given a channel number. Hereafter, the channel numbers assigned to the plurality of input channels ADch0 to ADch5 are respectively denoted by ADch0 to ADch5, for ease of explanation. At least two input channels out of the plurality of input channels ADch0 to ADch5 receive input of analog signals obtained by amplifying current values detected in the shunt resistors 108, and output the analog signals to the multiplexer 1100.

The multiplexer 1100 selects one of the plurality of input channels ADch0 to ADch5, and outputs an analog signal from the selected input channel to the A/D converter 1101.

The A/D converter 1101 converts the analog signal from the input channel selected by the multiplexer 1100 to a digital signal, and outputs the digital signal to the demultiplexer 1102.

The demultiplexer 1102 selects one of a plurality of output registers, and outputs the digital signal received from the A/D converter 1101 to the selected output register.

The control unit 1103 controls the multiplexer 1100, the A/D converter 1101, and the demultiplexer 1102.

The control unit 1103 references the register unit 1104, and determines an order of input channels to be selected by the multiplexer 1100. The control unit 1103 causes the multiplexer 1100 to select one of the plurality of input channels ADch0 to ADch5 and output an analog signal from the selected input channel to the A/D converter 1101, according to the determined order of input channels.

The control unit 1103 causes the A/D converter 1101 to convert the analog signal from the input channel selected by the multiplexer 1100 to a digital signal, and output the digital signal to the demultiplexer 1102.

The control unit 1103 causes the demultiplexer 1102 to select one of the plurality of output registers, and output the digital signal generated as a result of the conversion by the A/D converter 1101 to the selected output register.

Figure 7:
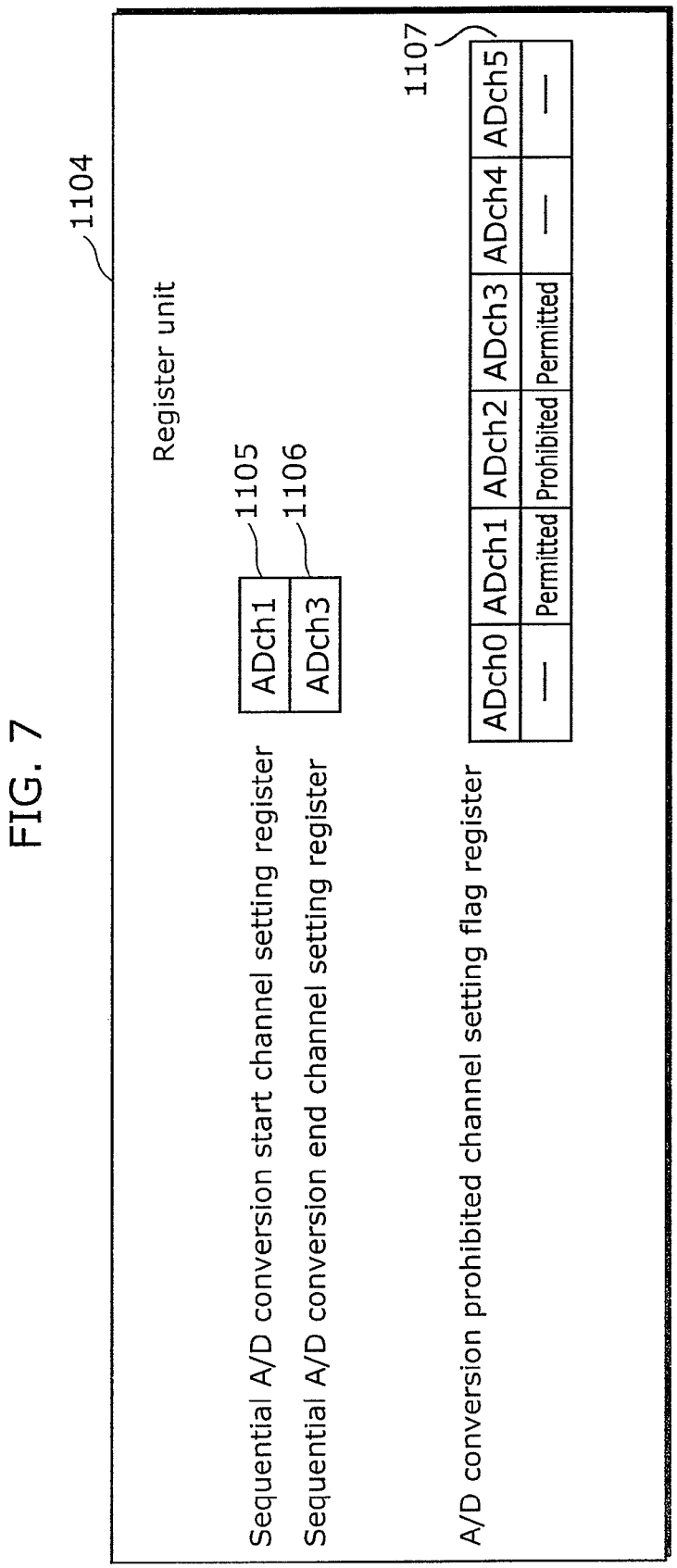
FIG. 7 is a block diagram showing a structure of a register unit in the A/D conversion unit in the first embodiment of the present invention.

FIG. 7 is a block diagram showing a structure of the register unit 1104 in the A/D conversion unit 110 of the three-shunt sensorless sinusoidal motor drive control apparatus 100 in the first embodiment.

The register unit 1104 includes a sequential A/D conversion start channel setting register 1105, a sequential A/D conversion end channel setting register 1106, and an A/D conversion prohibited channel setting flag register 1107. The register unit 1104 also includes a sequential A/D conversion reference start channel setting register 1110 and a sequential A/D conversion reference end channel setting register 1111, which are used for determining a sequential A/D conversion reference loop that defines an order and range of channel numbers of input channels that can be subject to selection by the multiplexer 1100.

In addition, the control unit 1103 determines a range of channel numbers of input channels to be selected by the multiplexer 1100 in the order of channel numbers of the sequential A/D conversion reference loop, according to the sequential A/D conversion start channel setting register 1105 and the sequential A/D conversion end channel setting register 1106 in the register unit 1104. That is, the control unit 1103 determines a sequential A/D conversion loop of input channels to be selected by the multiplexer 1100 as "sequential A/D conversion start channel→ . . . →sequential A/D conversion end channel→sequential A/D conversion start channel→ . . . ".

The A/D conversion prohibited channel setting flag register 1107 holds, for each of the channel numbers of the input channels that are subject to sequential A/D conversion, a flag indicating whether or not the input channel is a selection prohibited channel that is not to be selected by the multiplexer 1100.

In the case when the flags held in the A/D conversion prohibited channel setting flag register 1107 indicate that at least one of the input channels that are subject to sequential A/D conversion is a selection prohibited channel, a channel number of the selection prohibited channel is excluded from the order of channel numbers of the sequential A/D conversion loop which is determined according to the settings of the sequential A/D conversion start channel setting register 1105 and the sequential A/D conversion end channel setting register 1106. That is, the control unit 1103 causes the multiplexer 1100 to select input channels in the order of channel numbers (ADch1→ADch3→ADch1→ . . . ) from a channel number, such as ADch1, set in the sequential A/D conversion start channel setting register 1105 to a channel number, such as ADch3, set in the sequential A/D conversion end channel setting register 1106, excluding a channel number, such as ADch2, of an input channel that is indicated as a selection prohibited channel in a corresponding flag held in the A/D conversion prohibited channel setting flag register 1107. As a result, analog signals inputted into the selected input channels are sequentially outputted to the multiplexer 1100.

Figure 8A:
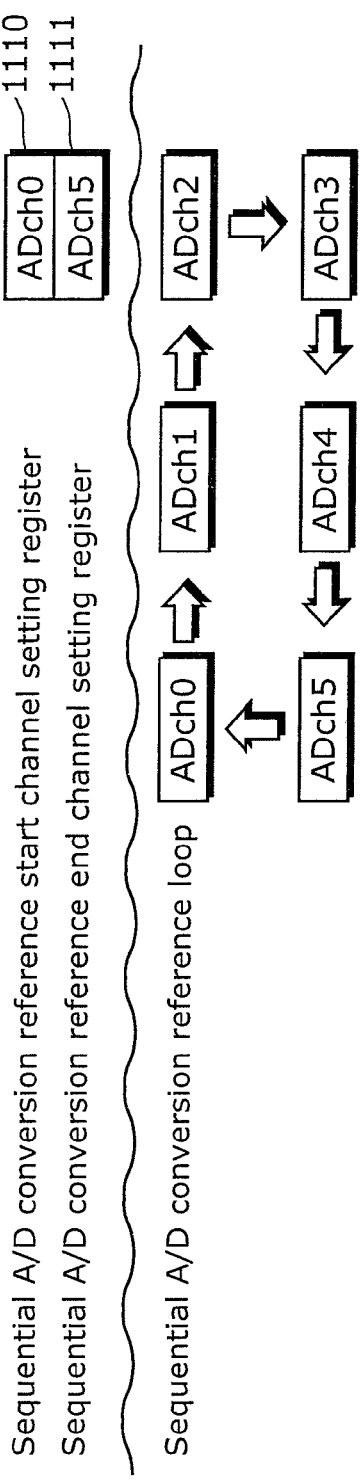
FIGS. 8A and 8B are explanatory views showing a sequential conversion operation of sequentially performing A/D conversion in the A/D conversion unit in the first embodiment of the present invention.
Figure 8B:
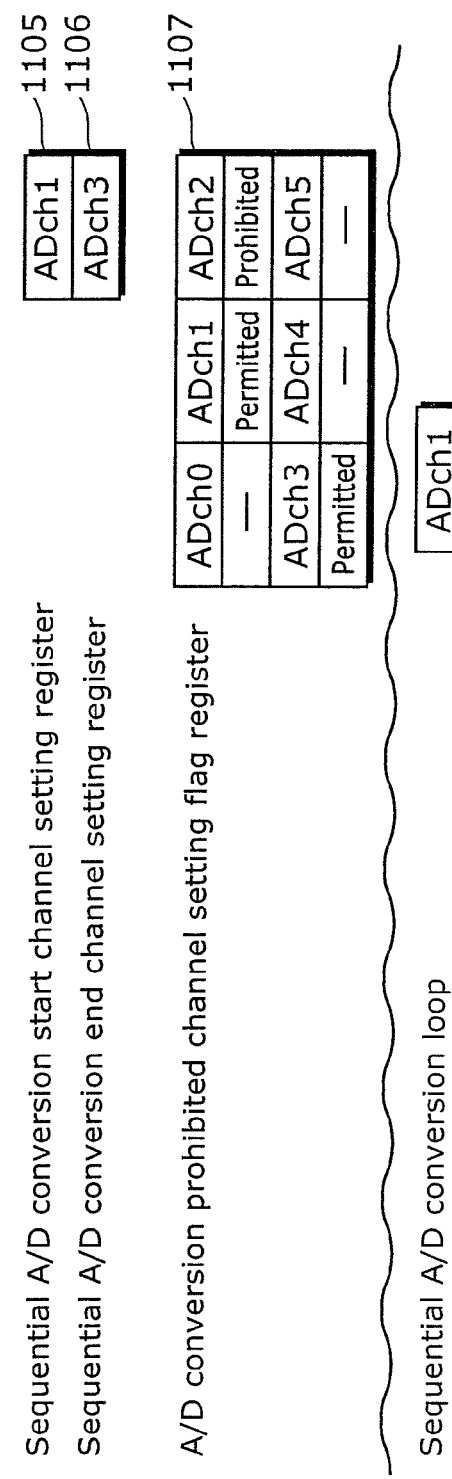

FIGS. 8A and 8B are explanatory views showing a sequential conversion operation of sequentially performing A/D conversion in the A/D conversion unit 110 in the first embodiment.

FIG. 8A shows a sequential A/D conversion reference loop that defines an order and range of channel numbers of input channels that can be subject to selection by the multiplexer 1100, in the case when the sequential A/D conversion reference start channel setting register 1110 is set to the channel number ADch0 and the sequential A/D conversion reference end channel setting register 1111 is set to the channel number ADch5.

As shown in FIG. 8A, the sequential A/D conversion reference loop (ADch0→ADch1→ADch2→ADch3→ADch4→ADch5→ . . . ) that starts with the channel number ADch0 and ends with the channel number ADch5 is determined according to the settings of the sequential A/D conversion reference start channel setting register 1110 and the sequential A/D conversion reference end channel setting register 1111.

This indicates that the A/D conversion unit 110 sequentially performs conversion in increasing order of channel number.

FIG. 8B shows a sequential conversion operation of sequentially performing A/D conversion in the A/D conversion unit 110, in the case when the sequential A/D conversion start channel setting register 1105 is set to the channel number ADch1, the sequential A/D conversion end channel setting register 1106 is set to the channel number ADch3, and the flags held in the A/D conversion prohibited channel setting flag register 1107 indicate that the input channel ADch1 is permitted, the input channel ADch2 is prohibited, and the input channel ADch3 is permitted (the flags corresponding to the input channels ADch0, ADch4, and ADch5 are arbitrarily set).

As noted above, the A/D conversion unit 110 sequentially performs conversion in increasing order of channel number.

This being so, a sequential A/D conversion loop (ADch1→ADch2→ADch3→ADch1→ . . . ) that starts with the input channel ADch1 of the channel number ADch1 and ends with the input channel ADch3 of the channel number ADch3 is determined by the settings of the sequential A/D conversion start channel setting register 1105 and the sequential A/D conversion end channel setting register 1106. The control unit 1103 then references the register unit 1104, and determines a sequential A/D conversion loop (ADch1→ADch3→ADch1→ . . . ) that excludes the channel number ADch2 of the input channel ADch2 indicated as a selection prohibited channel from the order of channel numbers of the sequential A/D conversion loop determined by the sequential A/D conversion start channel setting register 1105 and the sequential A/D conversion end channel setting register 1106, based on the prohibited channel information indicated by the flags held in the A/D conversion prohibited channel setting flag register 1107. The control unit 1103 controls the multiplexer 1100 and the A/D converter 1101, according to the determined sequential A/D conversion loop (ADch1→ADch3→ADch1→ . . . ). In detail, the control unit 1103 causes the multiplexer 1100 to select an input channel and output an analog signal from the selected input channel to the A/D converter 1101, according to the determined sequential A/D conversion loop (ADch1→ADch3→ADch1→ . . . ).

FIG. 9 shows a procedure of sequential A/D conversion in the A/D conversion unit 110 in the first embodiment.

First, in the A/D conversion unit 110, the control unit 1103 accesses the register unit 1104, and references the settings of the sequential A/D conversion reference start channel setting register 1110 and the sequential A/D conversion reference end channel setting register 1111 in the register unit 1104.

The control unit 1103 also references the sequential A/D conversion start channel setting register 1105 and the sequential A/D conversion end channel setting register 1106 in the register unit 1104, and reads channel numbers set in the sequential A/D conversion start channel setting register 1105 and the sequential A/D conversion end channel setting register 1106.

The control unit 1103 determines a sequential A/D conversion loop from the read channel start number and channel end number.

Next, the control unit 1103 references the A/D conversion prohibited channel setting flag register 1107 in the register unit 1104, and reads prohibited channel information which is prohibition information set in the A/D conversion prohibited channel setting flag register 1107 (Step S101).

The control unit 1103 controls the multiplexer 1100 and the A/D converter 1101 to sequentially perform A/D conversion, based on the read prohibition information (Step S102). In more detail, the control unit 1103 determines a sequential A/D conversion loop that excludes a channel number of a prohibited channel from the already determined sequential A/D conversion loop, and causes the multiplexer 1100 to select an input channel and output an analog signal from the selected input channel to the A/D converter 1101, according to this newly determined sequential A/D conversion loop. Thus, sequential A/D conversion is performed.

In the three-shunt sensorless sinusoidal motor drive control apparatus 100 that includes the A/D conversion unit 110 having one A/D converter in the first embodiment, the three phase motor currents detected by the shunt resistors 108 are amplified, and the amplified motor current values are inputted into the A/D conversion unit 110 as analog input signals.

It is assumed here that the analog input signals are inputted into the input channels ADch1, ADch2, and ADch3 in the A/D conversion unit 110.

The following describes a method in which the A/D conversion unit 110 having one A/D converter performs motor current detection in an A/D conversion period corresponding to two phases, in a motor current obtainment timing section during which the lower arm of the PWM signal of the motor control power module 106 is ON.

First, the sequential A/D conversion start channel setting register 1105 is set to the channel number of the input channel ADch1, and the sequential A/D conversion end channel setting register 1106 is set to the channel number of the input channel ADch3. As a result, a sequential A/D conversion loop (ADch1→ADch2→ADch3→ADch1→ . . . ) is determined.

Next, the flags held in the A/D conversion prohibited channel setting flag register 1107 are set to indicate that the input channel ADch1 is prohibited, the input channel ADch2 is permitted, and the input channel ADch3 is permitted (the flags corresponding to the input channels ADch0, ADch4, and ADch5 are arbitrarily set).

The control unit 1103 references the register unit 1104, and determines a sequential A/D conversion loop (ADch2→ADch3→ADch2→ . . . ) that excludes the channel number ADch1 of the prohibited channel indicated by the corresponding flag in the A/D conversion prohibited channel setting flag register 1107, from the sequential A/D conversion loop (ADch1→ADch2→ADch3→ADch1→ . . . ) which has been determined by the settings of the sequential A/D conversion start channel setting register 1105 and the sequential A/D conversion end channel setting register 1106 and the setting of sequentially performing conversion in increasing order of channel number.

The control unit 1103 controls the multiplexer 1100 and the A/D converter 1101, according to the determined sequential A/D conversion loop (ADch2→ADch3→ADch2→ . . . ). The control unit 1103 causes the multiplexer 1100 to select an input channel and output an analog signal from the selected input channel to the A/D converter 1101, according to the determined sequential A/D conversion loop (ADch2→ADch3→ADch2→ . . . ).

Thus, the A/D conversion unit 110 sequentially performs A/D conversion according to the sequential A/D conversion loop (ADch2→ADch3→ADch2→ . . . ). This enables motor current detection to be performed in an A/D conversion period corresponding to two phases.

Next, the flags held in the A/D conversion prohibited channel setting flag register 1107 are set to indicate that the input channel ADch1 is permitted, the input channel ADch2 is prohibited, and the input channel ADch3 is permitted (the flags corresponding to the input channels ADch0, ADch4, and ADch5 are arbitrarily set). Meanwhile, the sequential A/D conversion start channel setting register 1105 is set to the channel number of the input channel ADch1, and the sequential A/D conversion end channel setting register 1106 is set to the channel number of the input channel ADch3, as in the above case.

The control unit 1103 references the register unit 1104, and determines a sequential A/D conversion loop (ADch1→ADch3→ADch1→ . . . ) that excludes the channel number ADch2 of the prohibited channel indicated by the corresponding flag in the A/D conversion prohibited channel setting flag register 1107, from the sequential A/D conversion loop (ADch1→ADch2→ADch3→ADch1→ . . . ) which has been determined by the settings of the sequential A/D conversion start channel setting register 1105 and the sequential A/D conversion end channel setting register 1106 and the setting of sequentially performing conversion in increasing order of channel number.

The control unit 1103 controls the multiplexer 1100 and the A/D converter 1101, according to the determined sequential A/D conversion loop (ADch1→ADch3→ADch1→ . . . ). The control unit 1103 causes the multiplexer 1100 to select an input channel and output an analog signal from the selected input channel to the A/D converter 1101, according to the determined sequential A/D conversion loop (ADch1→ADch3→ADch1→ . . . ).

Thus, the A/D conversion unit 110 sequentially performs A/D conversion according to the sequential A/D conversion loop (ADch1→ADch3→ADch1→ . . . ). This enables motor current detection to be performed in an A/D conversion period corresponding to two phases.

By changing the settings of the flags held in the A/D conversion prohibited channel setting flag register 1107 in this way, the A/D conversion unit 110 can perform motor current detection at a next timing.

Following this, the flags held in the A/D conversion prohibited channel setting flag register 1107 are set to indicate that the input channel ADch1 is permitted, the input channel ADch2 is permitted, and the input channel ADch3 is prohibited (the flags corresponding to the input channels ADch0, ADch4, and ADch5 are arbitrarily set). Meanwhile, the sequential A/D conversion start channel setting register 1105 is set to the channel number of the input channel ADch1, and the sequential A/D conversion end channel setting register 1106 is set to the channel number of the input channel ADch3, as in the above case.

The control unit 1103 references the register unit 1104, and determines a sequential A/D conversion loop (ADch1→ADch2→ADch1→ . . . ) that excludes the channel number ADch3 of the prohibited channel indicated by the corresponding flag in the A/D conversion prohibited channel setting flag register 1107, from the sequential A/D conversion loop (ADch1→ADch2→ADch3→ADch1→ . . . ) which has been determined by the settings of the sequential A/D conversion start channel setting register 1105 and the sequential A/D conversion end channel setting register 1106 and the setting of sequentially performing conversion in increasing order of channel number.

The control unit 1103 controls the multiplexer 1100 and the A/D converter 1101, according to the determined sequential A/D conversion loop (ADch1→ADch2→ADch1→ . . . ). The control unit 1103 causes the multiplexer 1100 to select an input channel and output an analog signal from the selected input channel to the A/D converter 1101, according to the determined sequential A/D conversion loop (ADch1→ADch2→ADch1→ . . . ).

Thus, the A/D conversion unit 110 sequentially performs A/D conversion according to the sequential A/D conversion loop (ADch1→ADch2→ADch1→ . . . ). This enables motor current detection to be performed in an A/D conversion period corresponding to two phases.

By changing the settings of the flags held in the A/D conversion prohibited channel setting flag register 1107 in this way, the A/D conversion unit 110 can perform motor current detection at a further next timing.

As described above, by changing the prohibited channel information indicated by the flags held in the A/D conversion prohibited channel setting flag register 1107 according to need, the A/D conversion unit 110 can perform motor current detection in an A/D conversion period corresponding to two phases, in accordance with the determined sequential A/D conversion loop. For example, when a period required for A/D conversion in the A/D converter 1101 in the A/D conversion unit 110 is 1 μs, an A/D conversion period in the A/D converter 1101 required for the motor control microcomputer 107 to obtain the motor current values is 2 μs. Hence motor current detection can be performed in an A/D conversion period corresponding to two phases.

Moreover, by defining, for example, "1" as prohibited and "0" as permitted in each flag in the A/D conversion prohibited channel setting flag register 1107, it is possible to indicate whether or not the corresponding input channel is a prohibited channel that is not to be A/D-converted, using a 1-bit register resource. This allows the A/D conversion unit 110 having one A/D converter in the first embodiment to be realized with the number of bits of register resources same as the number of input channels. For instance, in the case when the number of all input channels that can be subject to A/D conversion is 16, the A/D conversion unit 110 can be realized with register resources of 16 bits.

As a result, an A/D conversion apparatus that reduces register resources to achieve a lower cost while minimizing the number of A/D converters can be realized.

This makes it possible to provide a motor control apparatus capable of motor current detection in an A/D conversion period corresponding to two phases out of three phases of a sinusoidal drive motor, at low cost.

Note that the setting of the sequential A/D conversion end channel setting register 1106 may be changed to increase the number of input channels that are subject to A/D conversion. In this case, by inputting an analog signal for use other than motor current detection into the A/D conversion unit 110 after motor current detection, the analog signal for the other use can be detected, too.

Moreover, the sequential A/D conversion reference loop may not necessarily be determined by the sequential A/D conversion reference start channel setting register 1110 and the sequential A/D conversion reference end channel setting register 1111 in the register unit 1104. Which is to say, the registers for setting the sequential A/D conversion reference loop may be omitted. For instance, the sequential A/D conversion reference loop may be hardware-dependent, that is, may be fixed in the A/D conversion unit 110.

Second Embodiment

A second embodiment of the present invention is described below, with reference to drawings.

The first embodiment describes an A/D conversion apparatus that reduces register resources to achieve a lower cost while minimizing the number of A/D converters, by providing the A/D conversion prohibited channel setting flag register 1107 in the A/D conversion unit 110. The second embodiment describes an A/D conversion apparatus that reduces register resources to achieve a lower cost while minimizing the number of A/D converters, by a different structure from the first embodiment.

Figure 10:
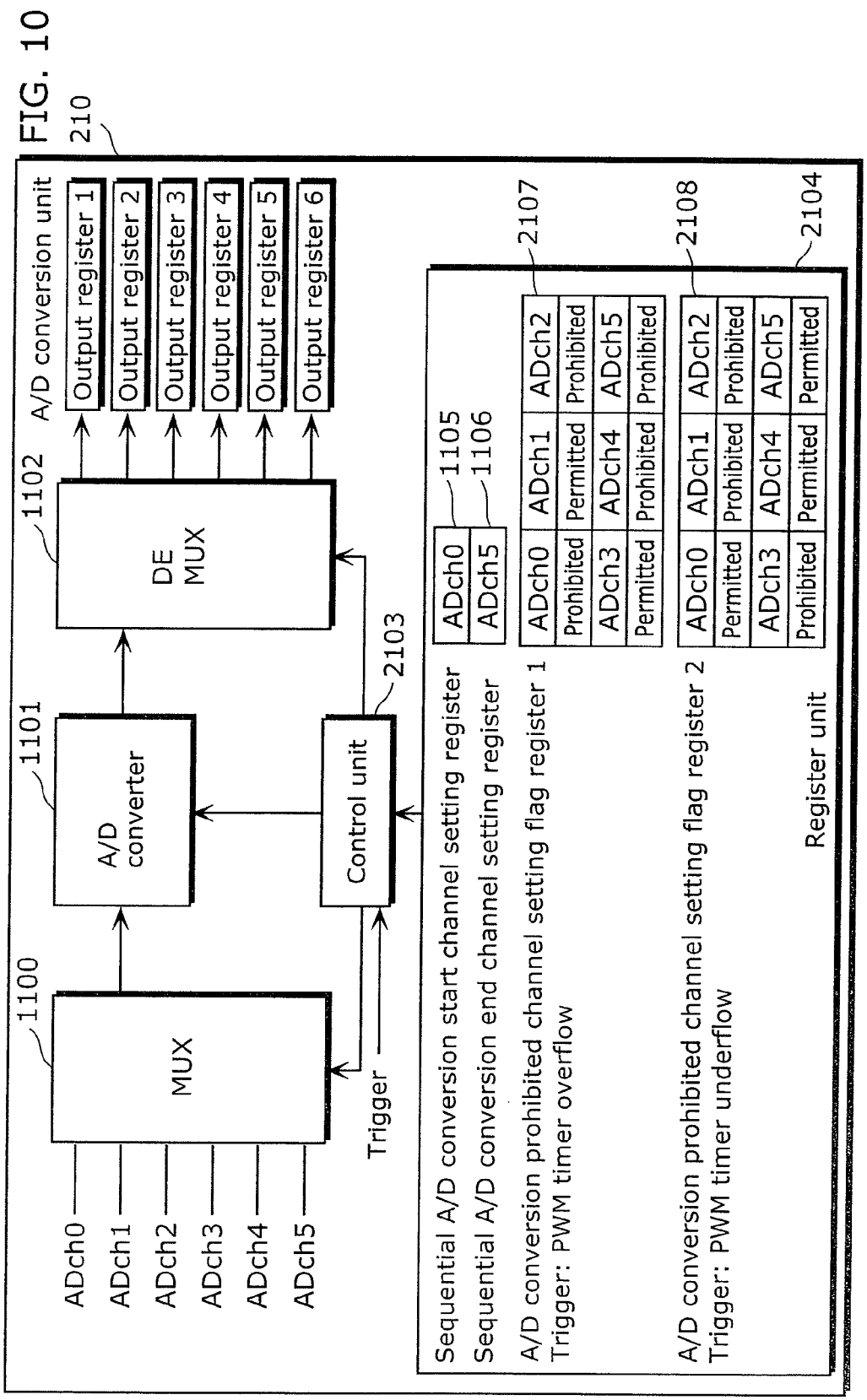
FIG. 10 is a block diagram showing a structure of an A/D conversion unit in a three-shunt sensorless sinusoidal motor drive control apparatus in a second embodiment of the present invention.

FIG. 10 is a block diagram showing a structure of an A/D conversion unit 210 in the three-shunt sensorless sinusoidal motor drive control apparatus 100 in the second embodiment. In FIG. 10, components which are the same as those in FIG. 6 have been given the same reference numerals, and their detailed explanation has been omitted here.

As shown in FIG. 10, the A/D conversion unit 210 includes the plurality of input channels ADch0 to ADch5, the multiplexer 1100, the A/D converter 1101, the demultiplexer 1102, a control unit 2103, and a register unit 2104. The A/D conversion unit 210 shown in FIG. 10 differs from the A/D conversion unit 110 of the first embodiment, in the structures of the control unit 2103 and the register unit 2104.

The control unit 2103 controls the multiplexer 1100, the A/D converter 1101, and the demultiplexer 1102.

The control unit 2103 references the register unit 2104, and determines an order of input channels to be selected by the multiplexer 1100. The control unit 2103 causes the multiplexer 1100 to select one of the plurality of input channels ADch0 to ADch5 and output an analog signal from the selected input channel to the A/D converter 1101, according to the determined order of input channels. The control unit 2103 causes the A/D converter 1101 to convert the analog signal from the input channel selected by the multiplexer 1100 to a digital signal, and output the digital signal to the demultiplexer 1102.

The control unit 2103 causes the demultiplexer 1102 to select one of the plurality of output registers, and output the digital signal received from the A/D converter 1101 to the selected output register.

Moreover, the control unit 2103 can receive input of a plurality of trigger signals. When a trigger signal is inputted into the control unit 2103, the control unit 2103 references the register unit 2104, determines an order of input channels to be selected by the multiplexer 1100, and starts sequential A/D conversion by controlling the multiplexer 1100, the A/D converter 1101, and the demultiplexer 1102. That is, sequential A/D conversion is initiated by a trigger signal.

The register unit 2104 includes the sequential A/D conversion start channel setting register 1105, the sequential A/D conversion end channel setting register 1106, and two A/D conversion prohibited channel setting flag registers 2107 and 2108 which are equal to the number of triggers corresponding to the plurality of trigger signals that can be inputted into the control unit 2103. Though the number of trigger signals that can be inputted into the control unit 2103 is 2 in this embodiment, the number of trigger signals is not limited to 2, and may be 3 or more.

The register unit 2104 also includes the sequential A/D conversion reference start channel setting register 1110 and the sequential A/D conversion reference end channel setting register 1111 as in FIG. 6, which are used for determining a sequential A/D conversion reference loop that defines an order and range of channel numbers of input channels that can be subject to selection by the multiplexer 1100.

In addition, the control unit 2103 determines a range of channel numbers of input channels to be selected by the multiplexer 1100 in the order of channel numbers of the sequential A/D conversion reference loop, according to the sequential A/D conversion start channel setting register 1105 and the sequential A/D conversion end channel setting register 1106 in the register unit 2104. That is, the control unit 2103 determines a sequential A/D conversion loop as "sequential A/D conversion start channel→ . . . →sequential A/D conversion end channel→sequential A/D conversion start channel→ . . . ".

Each of the A/D conversion prohibited channel setting flag registers 2107 and 2108 holds, for each of the channel numbers of the input channels that are subject to sequential A/D conversion, a flag showing whether or not the input channel is a selection prohibited channel that is not to be selected by the multiplexer 1100. The flags held in each of the A/D conversion prohibited channel setting flag registers 2107 and 2108 indicate information of a selection prohibition channel that is associated with a corresponding one of the trigger signals which can be inputted into the control unit 2103.

In the case when the flags held in the A/D conversion prohibited channel setting flag register 2107 or 2108 indicate that at least one of the input channels that are subject to sequential A/D conversion is a selection prohibited channel, a channel number of the selection prohibited channel is excluded from the order of channel numbers of the sequential A/D conversion loop determined by the settings of the sequential A/D conversion start channel setting register 1105 and the sequential A/D conversion end channel setting register 1106. That is, the control unit 2103 causes the multiplexer 1100 to select input channels in the order of channel numbers (ADch1→ADch3→ADch1→ . . . ) from a channel number, such as ADch1, set in the sequential A/D conversion start channel setting register 1105 to a channel number, such as ADch3, set in the sequential A/D conversion end channel setting register 1106, excluding a channel number, such as ADch2, of an input channel that is indicated as a selection prohibited channel in a corresponding flag held in the A/D conversion prohibited channel setting flag register 2107 or 2108. As a result, analog signals inputted into the selected input channels are sequentially outputted to the multiplexer 1100.

In the setting example of the register unit 2104 shown in FIG. 10, the triggers associated with the A/D conversion prohibited channel setting flag registers 2107 and 2108 respectively correspond to an overflow and an underflow of the PWM timer signal in the motor control microcomputer 907. The control unit 2103 determines a sequential A/D conversion loop 1 by the flags held in the A/D conversion prohibited channel setting flag register 2107, and determines a sequential A/D conversion loop 2 by the flags held in the A/D conversion prohibited channel setting flag register 2108.

It is to be noted that the second embodiment is similar to the first embodiment, except that a sequential A/D conversion loop determined by the control unit 2103 can be set for each trigger signal inputted into the control unit 2103.

Figure 11:
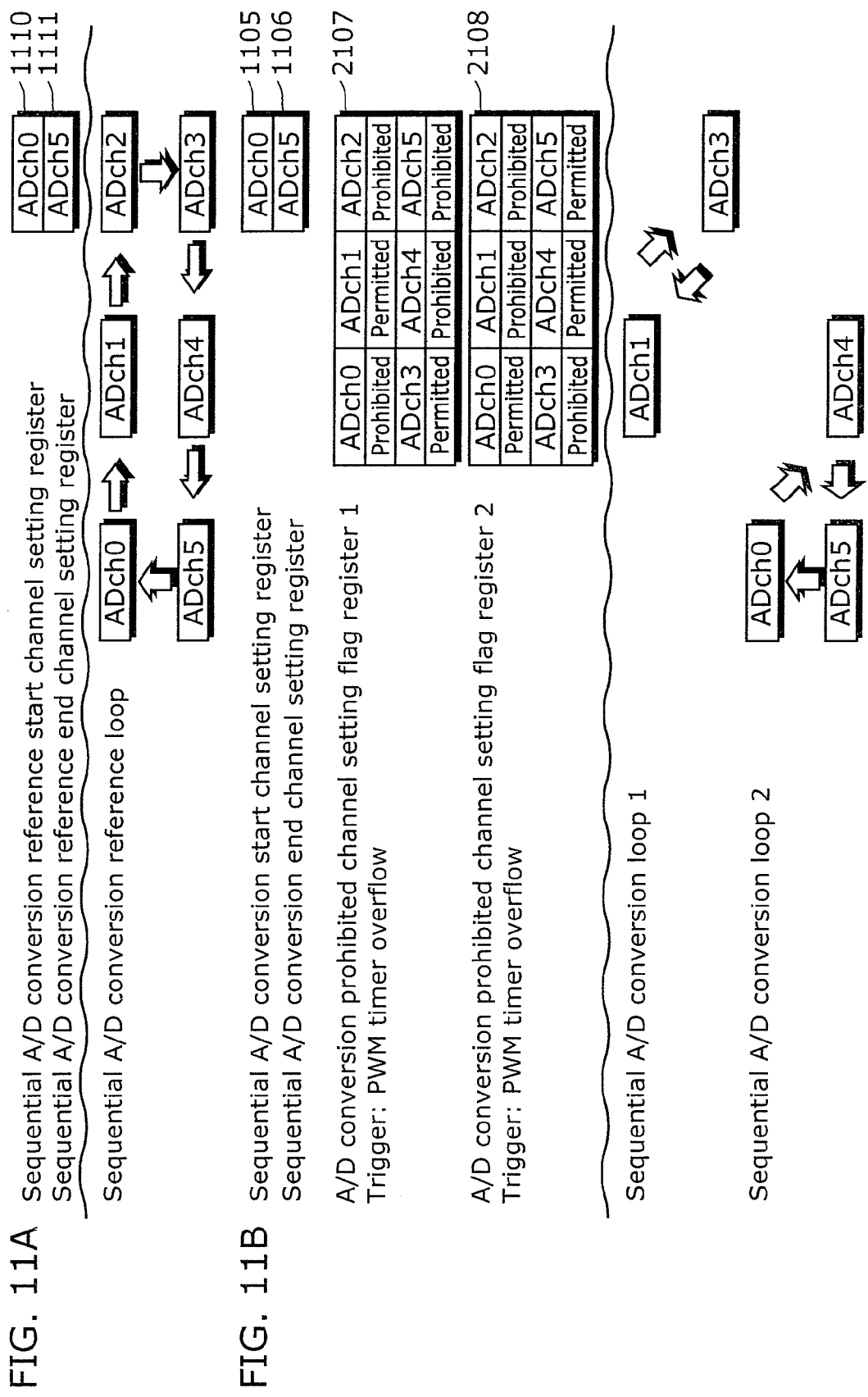
FIGS. 11A and 11B are explanatory views showing a sequential conversion operation of sequentially performing A/D conversion in the A/D conversion unit in the second embodiment of the present invention.

FIGS. 11A and 11B are explanatory views showing a sequential conversion operation of sequentially performing A/D conversion in the A/D conversion unit 210 in the second embodiment.

FIG. 11A is the same as FIG. 8A, and so its explanation has been omitted here. According to the setting of FIG. 11A, the sequential A/D conversion reference loop (ADch0→ADch1→ADch2→ADch3→ADch4→ADch5→ . . . ) is determined so that the A/D conversion unit 210 sequentially performs conversion in increasing order of channel number.

In FIG. 11B, the sequential A/D conversion start channel setting register 1105 is set to the channel number ADch0, and the sequential A/D conversion end channel setting register 1106 is set to the channel number ADch5. FIG. 11B shows a sequential conversion operation of sequentially performing A/D conversion in the A/D conversion unit 210 according to the sequential A/D conversion loop 1, in the case when the flags held in the A/D conversion prohibited channel setting flag register 2107 indicate that the input channel ADch0 is prohibited, the input channel ADch1 is permitted, the input channel ADch2 is prohibited, the input channel ADch3 is permitted, the input channel ADch4 is prohibited, and the input channel ADch5 is prohibited. FIG. 11B also shows a sequential conversion operation of sequentially performing A/D conversion in the A/D conversion unit 210 according to the sequential A/D conversion loop 2, in the case when the flags held in the A/D conversion prohibited channel setting flag register 2108 indicate that the input channel ADch0 is permitted, the input channel ADch1 is prohibited, the input channel ADch2 is prohibited, the input channel ADch3 is prohibited, the input channel ADch4 is permitted, and the input channel ADch5 is permitted.

When the above prohibited channel information is set in the flags held in the A/D conversion prohibited channel setting flag register 2107, the control unit 2103 references the register unit 2104, and determines the sequential A/D conversion loop 1 (ADch1→ADch3→ADch1→ . . . ) that excludes the channel number ADch2 of the input channel ADch2 indicated as a selection prohibited channel from the order of channel numbers of the sequential A/D conversion loop determined by the sequential A/D conversion start channel setting register 1105 and the sequential A/D conversion end channel setting register 1106, based on the prohibited channel information indicated by the flags held in the A/D conversion prohibited channel setting flag register 2107. The control unit 2103 controls the multiplexer 1100 and the A/D converter 1101, according to the determined sequential A/D conversion loop 1 (ADch1→ADch3→ADch1→ . . . ). The control unit 2103 causes the multiplexer 1100 to select an input channel and output an analog signal from the selected input channel to the A/D converter 1101, according to the determined sequential A/D conversion loop 1 (ADch1→ADch3→ADch1→ . . . ).

When the above prohibited channel information is set in the flags held in the A/D conversion prohibited channel setting flag register 2108, the control unit 2103 determines the sequential A/D conversion loop 2 (ADch0→ADch4→ADch5→ADch0→ . . . ) in the same manner as the sequential A/D conversion loop 1. The control unit 2103 controls the multiplexer 1100 and the A/D converter 1101, according to the determined sequential A/D conversion loop 2 (ADch0→ADch4→ADch5→ADch0→ . . . ). The control unit 2103 causes the multiplexer 1100 to select an input channel and output an analog signal from the selected input channel to the A/D converter 1101, according to the determined sequential A/D conversion loop 2 (ADch0→ADch4→ADch5→ADch0→ . . . ).

Figure 12:
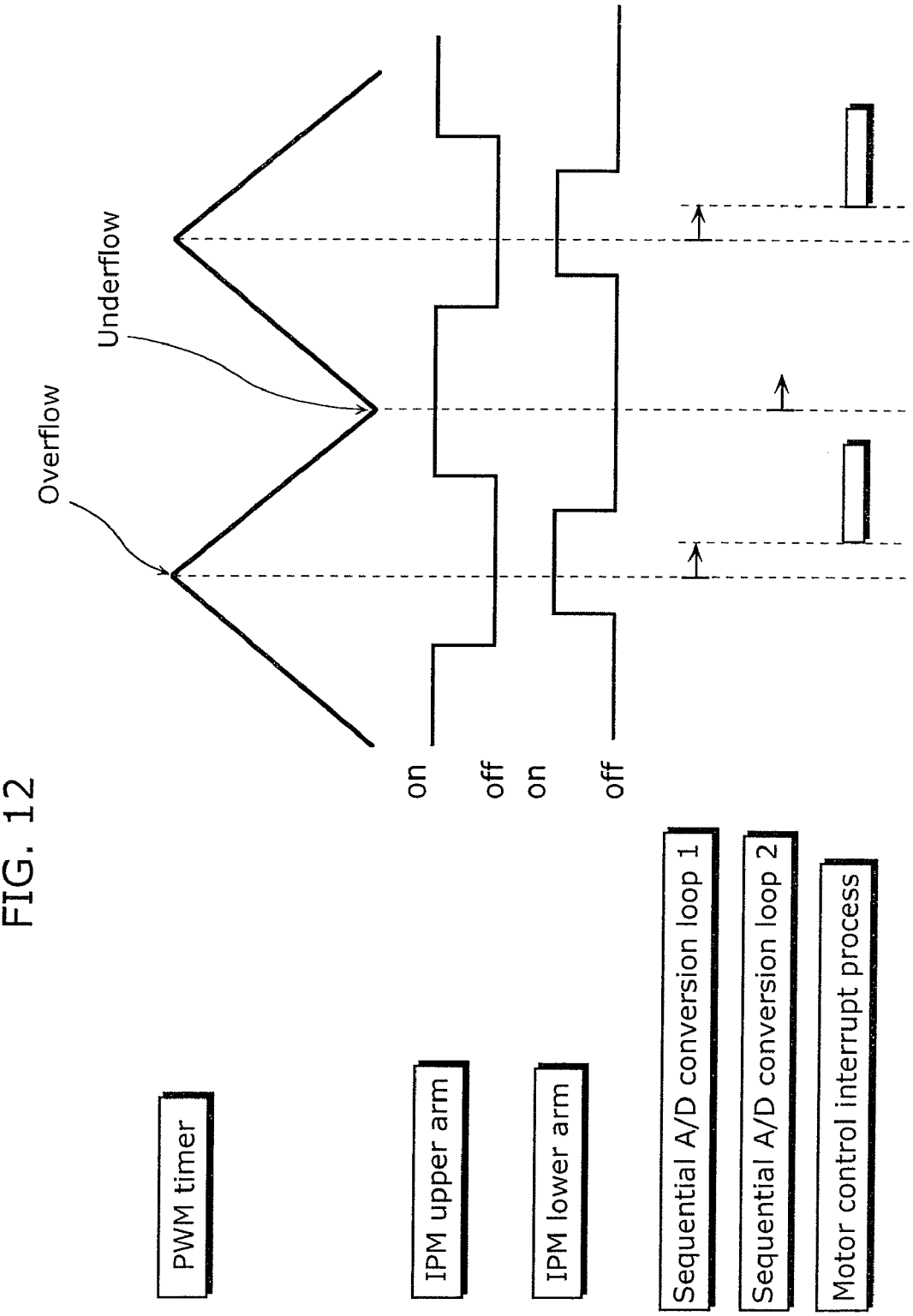
FIG. 12 is a timing chart showing a PWM timer signal in a motor control microcomputer and a PWM signal output waveform of a motor control power module.

FIG. 12 is a timing chart showing the PWM timer signal in the motor control microcomputer 107 and the PWM signal output waveform of the motor control power module 106.

FIG. 12 shows the sequential A/D conversion loop 1 which occurs in a motor current obtainment timing section, and the sequential A/D conversion loop 2 which occurs in an obtainment timing section of an input signal, other than a motor current value, that is inputted into the A/D conversion unit 210.

In FIG. 12, the triggers are set so that the sequential A/D conversion loop 1 starts when an overflow of the PWM timer signal in the motor control microcomputer 107 occurs, and the sequential A/D conversion loop 2 starts when an underflow of the PWM timer signal in the motor control microcomputer 107 occurs.

It is assumed here that the input channels ADch1, ADch2, and ADch3 are assigned to the three phase motor currents of the sinusoidal drive three-phase motor 105, and the input channels ADch0, ADch4, and ADch5 are assigned to other analog input values such as a DC voltage and a temperature sensor.

Note that, in the case of driving two or more motors, the other analog input values may be three phase motor currents of a second motor other than the sinusoidal drive three-phase motor 105.

First, in the A/D conversion unit 210, the control unit 2103 controls the multiplexer 1100 and the A/D converter 1101 to perform sequential A/D conversion of the three phase motor currents of the sinusoidal drive three-phase motor 105 according to the sequential A/D conversion loop 1 (ADch1→ADch3→ADch1→ . . . ) determined above, in a section during which the lower arm of the PWM signal of the motor control power module 106 (indicated as "IPM" in FIG. 12) is ON, that is, at a timing when the three phase motor currents of the sinusoidal drive three-phase motor 105 are obtainable.

Next, when a trigger signal is inputted into the control unit 2103, the sequential A/D conversion loop 1 is switched to the sequential A/D conversion loop 2. The sequential A/D conversion loop 2 is used to determine input channels that are to be A/D converted, as with the sequential A/D conversion loop 1.

The control unit 2103 controls the multiplexer 1100 and the A/D converter 1101 to perform sequential A/D conversion of the analog input values other than the three phase motor currents of the sinusoidal drive three-phase motor 105 according to the sequential A/D conversion loop 2 (ADch0→ADch4→ADch5→ADch0→ . . . ) determined above, in a section during which the lower arm of the PWM signal of the motor control power module 106 is OFF, that is, at a timing when the three phase motor currents of the sinusoidal drive three-phase motor 105 are not obtainable.

Thus, in a system where an analog input value other than the motor current values of the sinusoidal drive three-phase motor 105 needs to be obtained, a motor control interrupt process is executed to switch between the sequential A/D conversion loop 1 and the sequential A/D conversion loop 2, as shown in FIG. 12. Since the A/D converter 1101 can be used for obtaining the motor current values of the sinusoidal drive three-phase motor 105 and also for obtaining an analog input value other than the motor current values of the sinusoidal drive three-phase motor 105, the number of A/D converters necessary can be reduced by one. Furthermore, a time for the motor control interrupt process can be shortened, or a start timing of the motor control interrupt process with respect to the PWM timer can be made earlier.

Note here that, even in a system where an analog input value other than the motor current values of the sinusoidal drive three-phase motor 105 needs to be obtained, instead of switching between the sequential A/D conversion loop 1 and the sequential A/D conversion loop 2, a sequential A/D conversion loop may be set so that the analog input value other than the motor current values is converted following the obtainment of the motor current values. Moreover, one more A/D converter exclusively used for obtaining the analog input value other than the motor current values may be provided.

In the three-shunt sensorless sinusoidal motor drive control apparatus 100 that includes the A/D conversion unit 210 having one A/D converter in the second embodiment, the three phase motor currents detected by the shunt resistors 108 are amplified and the amplified motor current values are inputted into the A/D conversion unit 210 as analog input signals. It is assumed here that the analog input signals are inputted into the input channels ADch1, ADch2, and ADch3 in the A/D conversion unit 210.

In this case, the A/D conversion unit 210 having one A/D converter performs motor current detection in an A/D conversion period corresponding to two phases in a motor current obtainment timing section during which the lower arm of the PWM signal of the motor control power module 106 is ON, in the same manner as in the first embodiment. That is, channel numbers are set in the sequential A/D conversion start channel setting register 1105 and the sequential A/D conversion end channel setting register 1106 to determine a sequential A/D conversion loop, and further the settings of the flags indicating prohibited channel information in each of the two A/D conversion prohibited channel setting flag registers 2107 and 2108 are changed according to need. In this way, the A/D conversion unit 210 can perform motor current detection at each timing when an overflow of the PWM timer occurs.

As described above, by changing the prohibited channel information indicated by the flags held in each of the A/D conversion prohibited channel setting flag registers 2107 and 2108, the A/D conversion unit 210 can perform motor current detection in an A/D conversion period corresponding to two phases, in accordance with the determined sequential A/D conversion loop. For example, when a period required for A/D conversion in the A/D converter 1101 in the A/D conversion unit 210 is 1 μs, an A/D conversion period in the A/D converter 1101 required for the motor control microcomputer 107 to obtain the motor current values is 2 μs. Hence motor current detection can be performed in an A/D conversion period corresponding to two phases.

Moreover, by defining, for example, "1" as prohibited and "0" as permitted in each flag in each of the A/D conversion prohibited channel setting flag registers 2107 and 2108, it is possible to indicate whether or not the corresponding input channel is a prohibited channel that is not to be A/D converted, using a 1-bit register resource. This allows the A/D conversion unit 210 having one A/D converter in the second embodiment to be realized with the number of bits of register resources same as the number of input channels. For instance, in the case when the number of all input channels that can be subject to A/D conversion is 16 and the number of types of trigger signals is 2, the A/D conversion unit 210 can be realized with register resources of 32 bits.

Therefore, according to the second embodiment, an A/D conversion apparatus that reduces register resources to achieve a lower cost while minimizing the number of A/D converters can be realized.

This makes it possible to provide a motor control apparatus capable of motor current detection in an A/D conversion period corresponding to two phases out of three phases of a sinusoidal drive motor, at low cost.

In addition, by providing only A/D conversion prohibited channel setting flag registers as many as the necessary trigger signals, consumption of unnecessary register resources can be avoided. This contributes to a reduction in cost.

Note that the sequential A/D conversion reference loop may not necessarily be determined by the sequential A/D conversion reference start channel setting register 1110 and the sequential A/D conversion reference end channel setting register 1111 in the register unit 2104. Which is to say, the registers for setting the sequential A/D conversion reference loop may be omitted. For instance, the sequential A/D conversion reference loop may be hardware-dependent, that is, may be fixed in the A/D conversion unit 210.

Third Embodiment

A third embodiment of the present invention is described below, with reference to drawings.

The second embodiment describes an A/D conversion apparatus that reduces register resources to achieve a lower cost while minimizing the number of A/D converters, by providing the A/D conversion prohibited channel setting flag registers 2107 and 2108 which correspond in number to the trigger signals inputted into the control unit 2103, in the A/D conversion unit 210 having one A/D converter. The third embodiment describes an A/D conversion apparatus that reduces register resources to achieve a lower cost while minimizing the number of A/D converters, by a different structure from the second embodiment.

Figure 13:
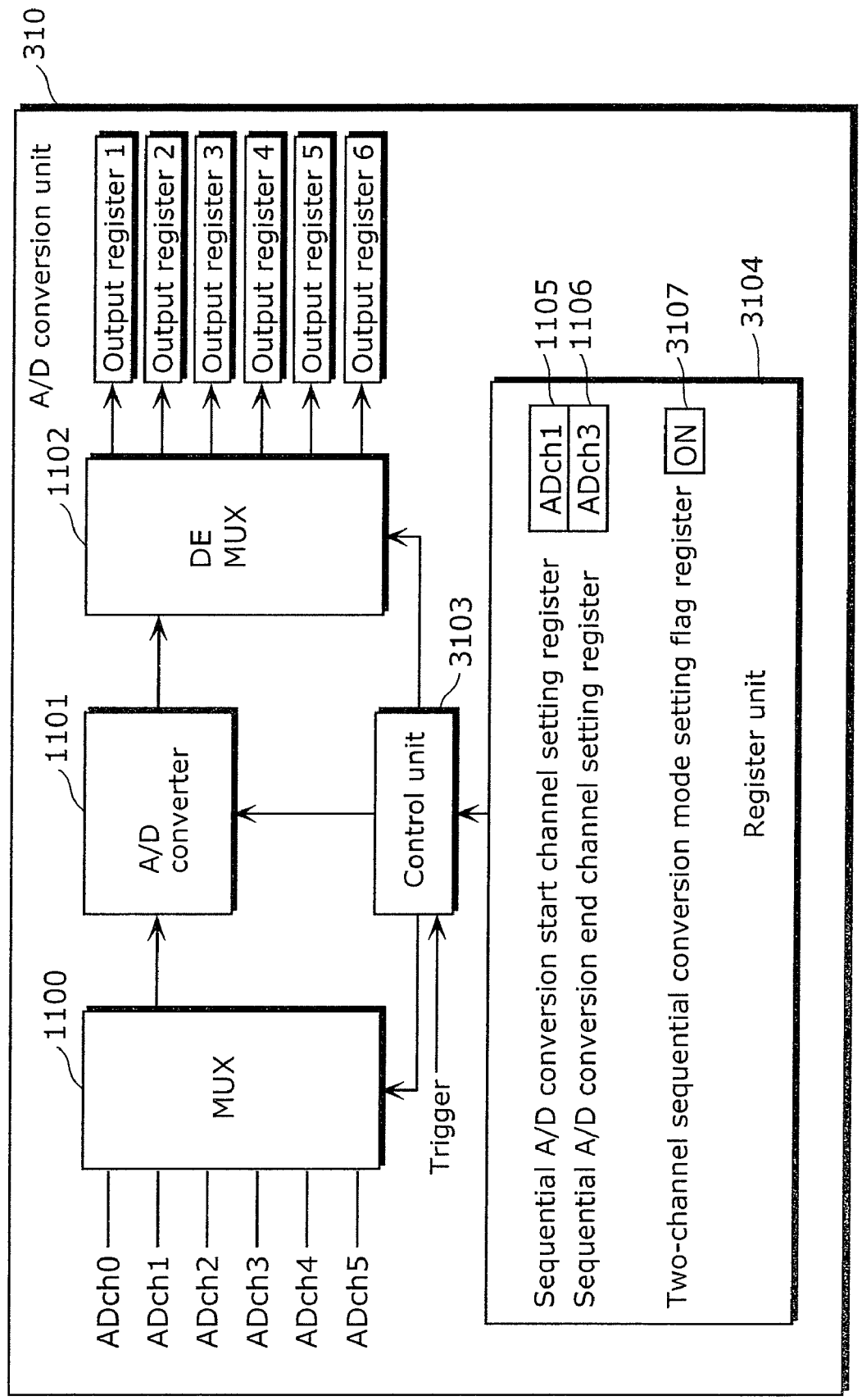
FIG. 13 is a block diagram showing a structure of an A/D conversion unit in a three-shunt sensorless sinusoidal motor drive control apparatus in a third embodiment of the present invention.

FIG. 13 is a block diagram showing a structure of an A/D conversion unit 310 in the three-shunt sensorless sinusoidal motor drive control apparatus 100 in the third embodiment. In FIG. 13, components which are the same as those in FIGS. 6 and 10 have been given the same reference numerals, and their detailed explanation has been omitted here.

As shown in FIG. 13, the A/D conversion unit 310 includes the plurality of input channels ADch0 to ADch5, the multiplexer 1100, the A/D converter 1101, the demultiplexer 1102, a control unit 3103, and a register unit 3104. The A/D conversion unit 310 shown in FIG. 13 differs from the A/D conversion unit 210 of the second embodiment, in the structures of the control unit 3103 and the register unit 3104.

The control unit 3103 controls the multiplexer 1100, the A/D converter 1101, and the demultiplexer 1102.

The control unit 3103 references the register unit 3104, and determines an order of input channels to be selected by the multiplexer 1100. The control unit 3103 causes the multiplexer 1100 to select one of the plurality of input channels ADch0 to ADch5 and output an analog signal from the selected input channel to the A/D converter 1101, according to the determined order of input channels. The control unit 3103 causes the A/D converter 1101 to convert the analog signal from the input channel selected by the multiplexer 1100 to a digital signal, and output the digital signal to the demultiplexer 1102.

The control unit 3103 causes the demultiplexer 1102 to select one of the plurality of output registers, and output the digital signal received from the A/D converter 1101 to the selected output register.

The register unit 3104 includes the sequential A/D conversion start channel setting register 1105, the sequential A/D conversion end channel setting register 1106, and a two-channel sequential conversion mode setting flag register 3107.

The register unit 3104 also includes the sequential A/D conversion reference start channel setting register 1110 and the sequential A/D conversion reference end channel setting register 1111 as in the first and second embodiments, which are used for determining a sequential A/D conversion reference loop that defines an order and range of channel numbers of input channels that can be subject to selection by the multiplexer 1100.

In addition, the control unit 3103 determines a range of channel numbers of input channels to be selected by the multiplexer 1100 in the order of channel numbers of the sequential A/D conversion reference loop, according to the sequential A/D conversion start channel setting register 1105 and the sequential A/D conversion end channel setting register 1106 in the register unit 3104. That is, the control unit 3103 determines a sequential A/D conversion loop as "sequential A/D conversion start channel→ . . . →sequential A/D conversion end channel→sequential A/D conversion start channel→ . . . ".

The two-channel sequential conversion mode setting flag register 3107 holds a flag indicating whether or not to operate in a mode in which input channels of all channel numbers other than channel numbers set in the sequential A/D conversion start channel setting register 1105 and the sequential A/D conversion end channel setting register 1106 are not to be selected by the multiplexer 1100.

In the case when the flag held in the two-channel sequential conversion mode setting flag register 3107 indicates to operate in the mode in which the input channels of all channel numbers other than the channel numbers set in the sequential A/D conversion start channel setting register 1105 and the sequential A/D conversion end channel setting register 1106 are not to be selected by the multiplexer 1100 (hereafter, to operate in this mode is referred to as "ON mode"), each channel number other than the channel numbers set in the sequential A/D conversion start channel setting register 1105 and the sequential A/D conversion end channel setting register 1106 is excluded. That is, the control unit 3103 causes the multiplexer 1100 to select only the input channels corresponding to the channel number, such as ADch1, set in the sequential A/D conversion start channel setting register 1105 and the channel number, such as ADch3, set in the sequential A/D conversion end channel setting register 1106 (ADch1→ADch3→ADch1→ . . . ). As a result, analog signals inputted into the selected input channels are sequentially outputted to the multiplexer 1100.

Figure 14:
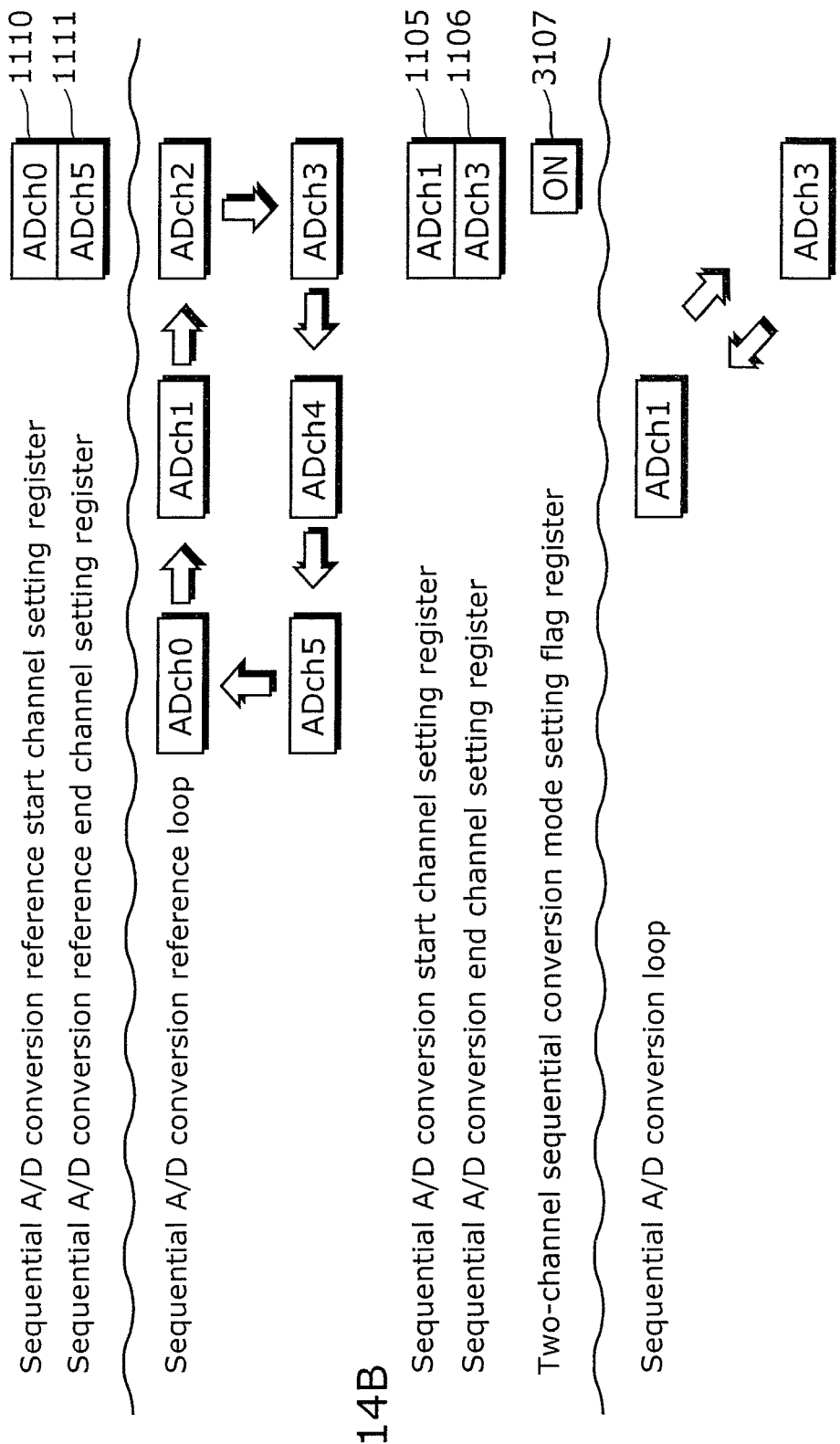
FIGS. 14A and 14B are explanatory views showing a sequential conversion operation of sequentially performing A/D conversion in the A/D conversion unit in the third embodiment of the present invention.

FIGS. 14A and 14B are explanatory views showing a sequential conversion operation of sequentially performing A/D conversion in the A/D conversion unit 310 in the third embodiment.

FIG. 14A is the same as FIGS. 8A and 11A, and so its explanation has been omitted here. According to the setting of FIG. 14A, the sequential A/D conversion reference loop (ADch0→ADch1→ADch2→ADch3→ADch4→ADch5→ . . . ) is determined so that the A/D conversion unit 310 sequentially performs conversion in increasing order of channel number.

FIG. 14B shows a sequential conversion operation of sequentially performing A/D conversion in the A/D conversion unit 310, in the case when the sequential A/D conversion start channel setting register 1105 is set to the channel number ADch1, the sequential A/D conversion end channel setting register 1106 is set to the channel number ADch3, and the flag held in the two-channel sequential conversion mode setting flag register 3107 is set to indicate the ON mode.

In the A/D conversion unit 310, conversion is sequentially performed in increasing order of channel number. This being so, the control unit 3103 determines a sequential A/D conversion loop (ADch1→ADch3→ADch1→ . . . ) that selects only the input channel ADch1 of the channel number ADch1 and the input channel ADch3 of the channel number ADch3, according to the settings of the sequential A/D conversion start channel setting register 1105 and the sequential A/D conversion end channel setting register 1106 and the setting of the ON mode in the flag held in the two-channel sequential conversion mode setting flag register 3107. Which is to say, the control unit 3103 references the register unit 3104, and determines the sequential A/D conversion loop (ADch1→ADch3→ADch1→ . . . ) that selects only the input channel ADch1 of the channel number ADch1 set in the sequential A/D conversion start channel setting register 1105 and the input channel ADch3 of the channel number ADch3 set in the sequential A/D conversion end channel setting register 1106, based on the ON mode indicated by the flag in the two-channel sequential conversion mode setting flag register 3107. The control unit 3103 controls the multiplexer 1100 and the A/D converter 1101, according to the determined sequential A/D conversion loop (ADch1→ADch3→ADch1→ . . . ). The control unit 3103 causes the multiplexer 1100 to select an input channel and output an analog signal from the selected input channel to the A/D converter 1101, according to the determined sequential A/D conversion loop (ADch1→ADch3→ADch1→ . . . ).

In the three-shunt sensorless sinusoidal motor drive control apparatus 100 that includes the A/D conversion unit 310 having one A/D converter in the third embodiment, the three phase motor currents detected by the shunt resistors 108 are amplified and the amplified motor current values are inputted into the A/D conversion unit 310 as analog input signals.

It is assumed here that the analog input signals are inputted into the input channels ADch1, ADch2, and ADch3 in the A/D conversion unit 310.

The following describes a method in which the A/D conversion unit 310 having one A/D converter performs motor current detection in an A/D conversion period corresponding to two phases, in a motor current obtainment timing section during which the lower arm of the PWM signal of the motor control power module 106 is ON.

First, the flag held in the two-channel sequential conversion mode setting flag register 3107 is set to indicate the ON mode.

Next, the sequential A/D conversion start channel setting register 1105 is set to the channel number of the input channel ADch1, and the sequential A/D conversion end channel setting register 1106 is set to the channel number of the input channel ADch2. That is, information indicating that the sequential A/D conversion start channel is ADch1 and the sequential A/D conversion end channel is ADch2 is set in the sequential A/D conversion start channel setting register 1105 and the sequential A/D conversion end channel setting register 1106. As a result, a sequential A/D conversion loop (ADch1→ADch2→ADch1→ADch2→ . . . ) is determined. This sequential A/D conversion loop is determined by the control unit 3103 referencing the register unit 3104.

The control unit 3103 causes the multiplexer 1100 to select an input channel and output an analog signal from the selected input channel to the A/D converter 1101, according to the determined sequential A/D conversion loop (ADch1→ADch2→ADch1→ . . . ).

Thus, the A/D conversion unit 310 sequentially performs A/D conversion according to the sequential A/D conversion loop (ADch1→ADch2→ADch1→ . . . ). This enables motor current detection to be performed in an A/D conversion period corresponding to two phases.

Next, information indicating that the sequential A/D conversion start channel is ADch2 and the sequential A/D conversion end channel is ADch3 is set in the sequential A/D conversion start channel setting register 1105 and the sequential A/D conversion end channel setting register 1106. As a result, a sequential A/D conversion loop (ADch2→ADch3→ADch2→ADch3→ . . . ) is determined. Here, the flag held in the two-channel sequential conversion mode setting flag register 3107 indicates the ON mode, as in the above case.

The control unit 3103 causes the multiplexer 1100 to select an input channel and output an analog signal from the selected input channel to the A/D converter 1101, according to the determined sequential A/D conversion loop (ADch2→ADch3→ADch2→ . . . ).

Thus, the A/D conversion unit 310 sequentially performs A/D conversion according to the sequential A/D conversion loop (ADch2→ADch3→ADch2→ . . . ). This enables motor current detection to be performed in an A/D conversion period corresponding to two phases.

Following this, information indicating that the sequential A/D conversion start channel is ADch3 and the sequential A/D conversion end channel is ADch1 is set in the sequential A/D conversion start channel setting register 1105 and the sequential A/D conversion end channel setting register 1106. As a result, a sequential A/D conversion loop (ADch3→ADch1→ADch3→ADch1→ . . . ) is determined.

Thus, the A/D conversion unit 310 sequentially performs A/D conversion according to the sequential A/D conversion loop (ADch3→ADch1→ADch3→ . . . ), in the same manner as above. This enables motor current detection to be performed in an A/D conversion period corresponding to two phases.

In this way, by changing the settings of the sequential A/D conversion start channel setting register 1105 and the sequential A/D conversion end channel setting register 1106 while setting the flag held in the two-channel sequential conversion mode setting flag register 3107 to the ON mode, the A/D conversion unit 310 can perform motor current detection at successive timings.

As described above, by changing the information about the sequential A/D conversion start channel and the sequential A/D conversion end channel in the sequential A/D conversion start channel setting register 1105 and the sequential A/D conversion end channel setting register 1106 according to need while setting the flag held in the two-channel sequential conversion mode setting flag register 3107 to the ON mode, the A/D conversion unit 310 can perform motor current detection in an A/D conversion period corresponding to two phases, in accordance with the determined sequential A/D conversion loop. For example, by defining "1" as the ON mode and "0" as the OFF mode, i.e., not the ON mode, in the flag held in the two-channel sequential conversion mode setting flag register 3107, it is possible to realize the two-channel sequential conversion mode setting flag register 3107 with a 1-bit register resource. This allows the A/D conversion unit 310 having one A/D converter in the third embodiment to be realized with a 1-bit register resource corresponding to one flag.

Therefore, according to the third embodiment, an A/D conversion apparatus that reduces register resources to achieve a lower cost while minimizing the number of A/D converters can be realized.

This makes it possible to provide a motor control apparatus capable of motor current detection in an A/D conversion period corresponding to two phases out of three phases of a sinusoidal drive motor, at low cost.

Note that the sequential A/D conversion reference loop may not necessarily be determined by the sequential A/D conversion reference start channel setting register 1110 and the sequential A/D conversion reference end channel setting register 1111 in the register unit 3104. Which is to say, the registers for setting the sequential A/D conversion reference loop may be omitted. For instance, the sequential A/D conversion reference loop may be hardware-dependent, that is, may be fixed in the A/D conversion unit 310.

Fourth Embodiment

A fourth embodiment of the present invention is described below, with reference to drawings.

The third embodiment describes an A/D conversion apparatus that reduces register resources to achieve a lower cost while minimizing the number of A/D converters, by providing the two-channel sequential conversion mode setting flag register 3107 in the A/D conversion unit 310 having one A/D converter. The fourth embodiment describes an A/D conversion apparatus that reduces register resources to achieve a lower cost while minimizing the number of A/D converters, by a different structure from the third embodiment.

Figure 15:
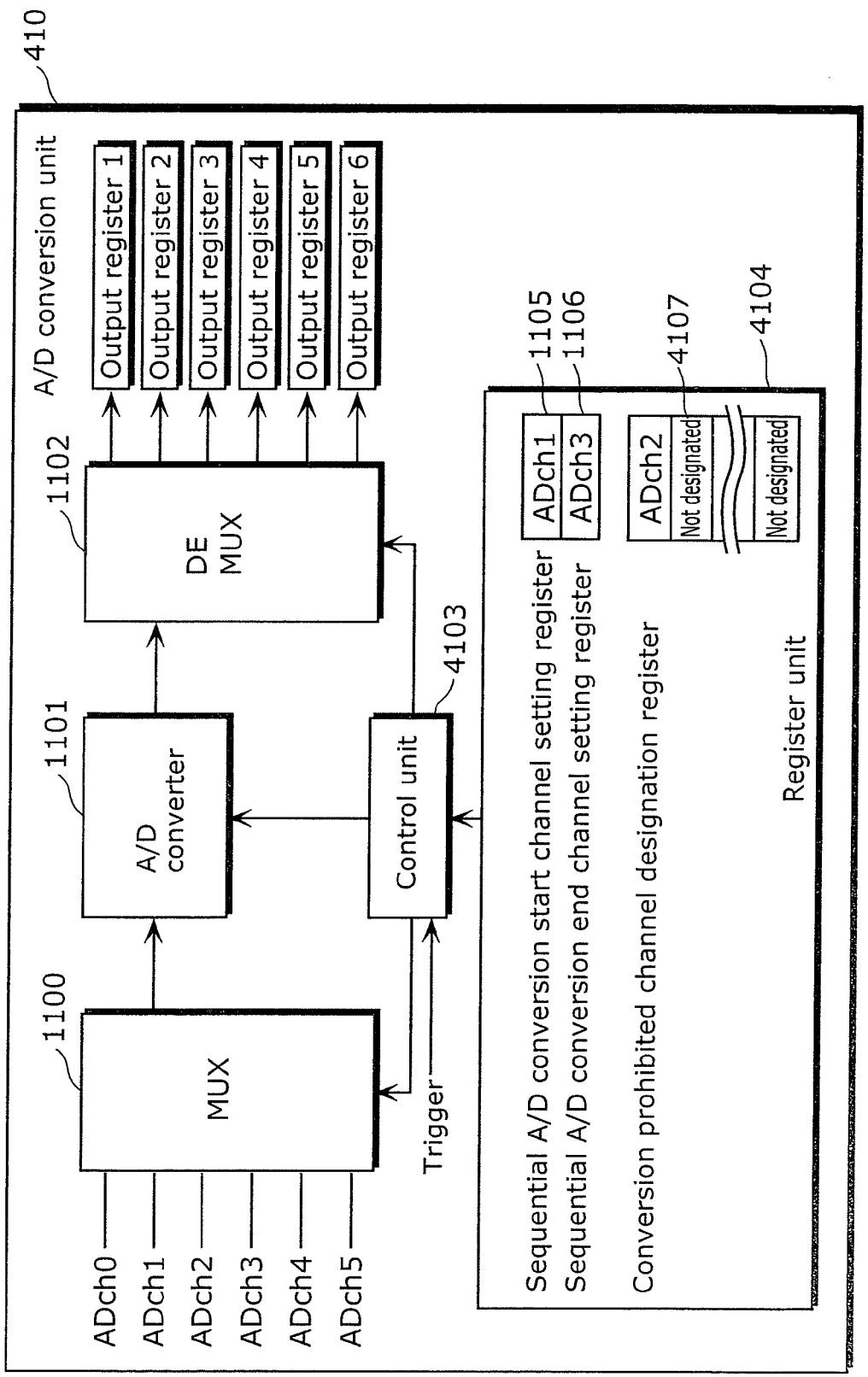
FIG. 15 is a block diagram showing a structure of an A/D conversion unit in a three-shunt sensorless sinusoidal motor drive control apparatus in a fourth embodiment of the present invention.

FIG. 15 is a block diagram showing a structure of an A/D conversion unit 410 in the three-shunt sensorless sinusoidal motor drive control apparatus 100 in the fourth embodiment. In FIG. 15, components which are the same as those in FIGS. 6, 10, and 13 have been given the same reference numerals, and their detailed explanation has been omitted here.

As shown in FIG. 15, the A/D conversion unit 410 includes the plurality of input channels ADch0 to ADch5, the multiplexer 1100, the A/D converter 1101, the demultiplexer 1102, a control unit 4103, and a register unit 4104. The A/D conversion unit 410 shown in FIG. 15 differs from the A/D conversion unit 310 of the third embodiment, in the structures of the control unit 4103 and the register unit 4104.

The control unit 4103 references the register unit 4104, and determines an order of input channels to be selected by the multiplexer 1100. The control unit 4103 causes the multiplexer 1100 to select one of the plurality of input channels ADch0 to ADch5 and output an analog signal from the selected input channel to the A/D converter 1101, according to the determined order of input channels. The control unit 4103 causes the A/D converter 1101 to convert the analog signal from the input channel selected by the multiplexer 1100 to a digital signal, and output the digital signal to the demultiplexer 1102.

The control unit 4103 causes the demultiplexer 1102 to select one of the plurality of output registers, and output the digital signal received from the A/D converter 1101 to the selected output register.

The register unit 4104 includes the sequential A/D conversion start channel setting register 1105, the sequential A/D conversion end channel setting register 1106, and a conversion prohibited channel designation register 4107.

The register unit 4104 also includes the sequential A/D conversion reference start channel setting register 1110 and the sequential A/D conversion reference end channel setting register 1111 as in the first to third embodiments, which are used for determining a sequential A/D conversion reference loop that defines an order and range of channel numbers of input channels that can be subject to selection by the multiplexer 1100.

In addition, the control unit 4103 determines a range of channel numbers of input channels to be selected by the multiplexer 1100 in the order of channel numbers of the sequential A/D conversion reference loop, according to the sequential A/D conversion start channel setting register 1105 and the sequential A/D conversion end channel setting register 1106 in the register unit 4104. That is, the control unit 4103 determines a sequential A/D conversion loop as "sequential A/D conversion start channel→ ... →sequential A/D conversion end channel→sequential A/D conversion start channel→ ... ".

The conversion prohibited channel designation register 4107 holds information that directly designates an input channel not to be selected by the multiplexer 1100.

In the case when the conversion prohibited channel designation register 4107 holds information which directly designates an input channel not to be selected by the multiplexer 1100, a channel number of the input channel designated by the conversion prohibited channel designation register 4107 is excluded from the sequential A/D conversion loop determined by the settings of the sequential A/D conversion start channel setting register 1105 and the sequential A/D conversion end channel setting register 1106. That is, the control unit 4103 causes the multiplexer 1100 to select input channels in the order of channel numbers (ADch1→ADch3→ADch1→ ... ) from a channel number, such as ADch1, set in the sequential A/D conversion start channel setting register 1105 to a channel number, such as ADch3, set in the sequential A/D conversion end channel setting register 1106, excluding a channel number, such as ADch2, designated in the conversion prohibited channel designation register 4107. As a result, analog signals inputted into the selected input channels are sequentially outputted to the multiplexer 1100.

Figure 16A:
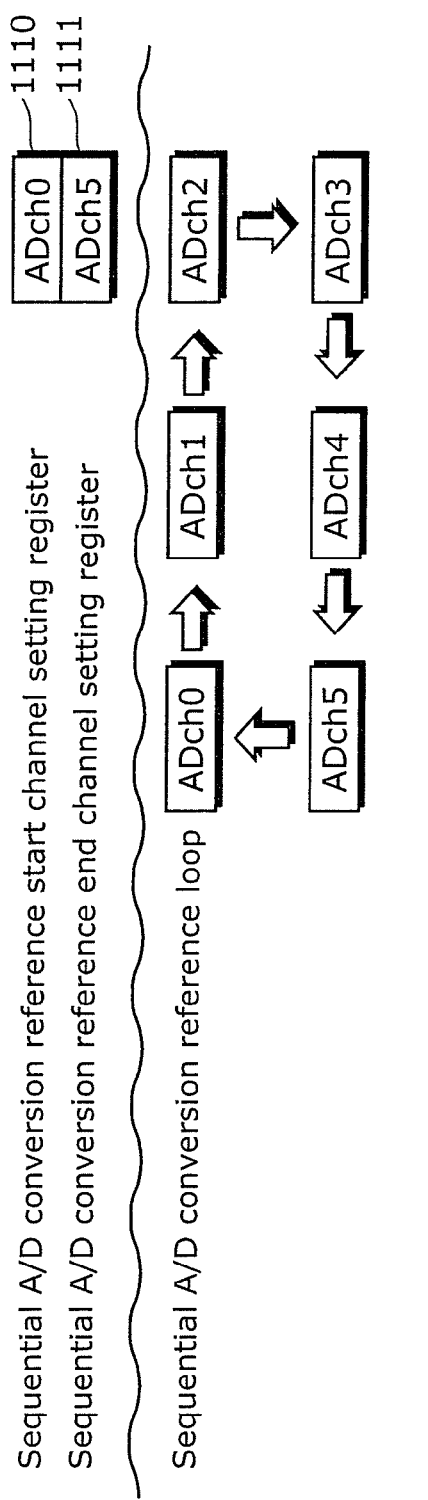
FIGS. 16A and 16B are explanatory views showing a sequential conversion operation of sequentially performing A/D conversion in the A/D conversion unit in the fourth embodiment of the present invention.
Figure 16B:
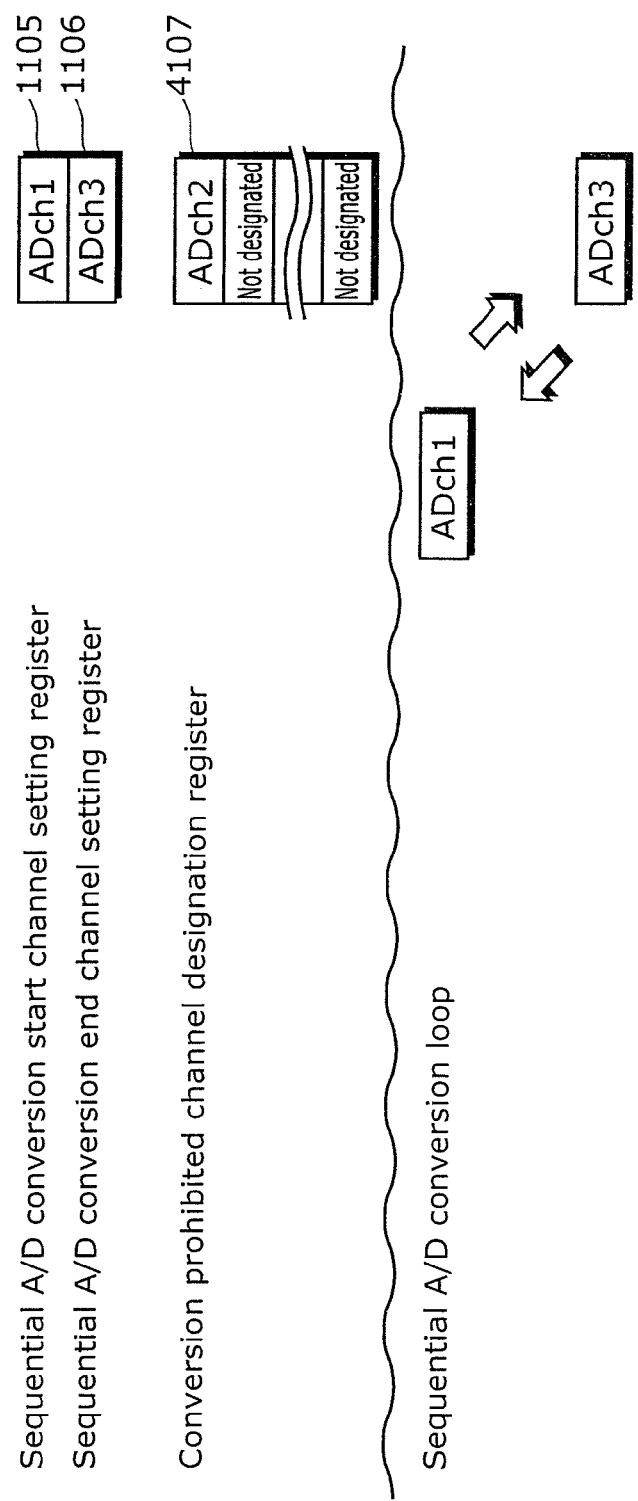

FIGS. 16A and 16B are explanatory views showing a sequential conversion operation of sequentially performing A/D conversion in the A/D conversion unit 410 in the fourth embodiment.

FIG. 16A is the same as FIGS. 8A, 11A, and 14A, and so its explanation has been omitted here. According to the setting of FIG. 16A, the sequential A/D conversion reference loop (ADch0→ADch1→ADch2→ADch3→ADch4→ADch5→ ... ) is determined so that the A/D conversion unit 410 sequentially performs conversion in increasing order of channel number.

FIG. 16B shows a sequential conversion operation of sequentially performing A/D conversion in the A/D conversion unit 410, in the case when the sequential A/D conversion start channel setting register 1105 is set to the channel number ADch1, the sequential A/D conversion end channel setting register 1106 is set to the channel number ADch3, and the conversion prohibited channel designation register 4107 is set to designate the channel number ADch2.

In the A/D conversion unit 410, conversion is sequentially performed in increasing order of channel number.

This being so, the control unit 4103 determines a sequential A/D conversion loop (ADch1→ADch3→ADch1→ ... ) that excludes the channel number ADch2 of the input channel designated as a conversion prohibited channel from channel numbers included in a sequential A/D conversion loop (ADch1→ADch2→ADch3→ADch1→ ... ) determined by the sequential A/D conversion start channel setting register 1105 and the sequential A/D conversion end channel setting register 1106, according to the settings of the sequential A/D conversion start channel setting register 1105 and the sequential A/D conversion end channel setting register 1106 and the setting of the conversion prohibited channel designation register 4107. The control unit 4103 controls the multiplexer 1100 and the A/D converter 1101, according to the determined sequential A/D conversion loop (ADch1→ADch3→ADch1→ ... ). The control unit 4103 causes the multiplexer 1100 to select an input channel and output an analog signal from the selected input channel to the A/D converter 1101, according to the determined sequential A/D conversion loop (ADch1→ADch3→ADch1→ ... ).

In the three-shunt sensorless sinusoidal motor drive control apparatus 100 that includes the A/D conversion unit 410 having one A/D converter in the fourth embodiment, the three phase motor currents detected by the shunt resistors 108 are amplified and the amplified motor current values are inputted into the A/D conversion unit 410 as analog input signals.

It is assumed here that the analog input signals are inputted into the input channels ADch1, ADch2, and ADch3 in the A/D conversion unit 410.

The following describes a method in which the A/D conversion unit 410 having one A/D converter performs motor current detection in an A/D conversion period corresponding to two phases, in a motor current obtainment timing section during which the lower arm of the PWM signal of the motor control power module 106 is ON.

First, the sequential A/D conversion start channel setting register 1105 is set to the channel number of the input channel ADch1, and the sequential A/D conversion end channel setting register 1106 is set to the channel number of the input channel ADch3. As a result, a sequential A/D conversion loop (ADch1→ADch2→ADch3→ADch1→ ... ) is determined.

Next, the conversion prohibited channel designation register 4107 is set to designate the input channel ADch1 as a conversion prohibited channel.

The control unit 4103 references the register unit 4104, and determines a sequential A/D conversion loop (ADch2→ADch3→ADch2→ ... ) that excludes the channel number ADch1 of the input channel ADch1 designated as a conversion prohibited channel in the conversion prohibited channel designation register 4107, from the sequential A/D conversion loop (ADch1→ADch2→ADch3→ADch1→ ... ) which has been determined by the settings of the sequential A/D conversion start channel setting register 1105 and the sequential A/D conversion end channel setting register 1106 and the setting of sequentially performing conversion in increasing order of channel number.

The control unit 4103 controls the multiplexer 1100 and the A/D converter 1101, according to the determined sequential A/D conversion loop (ADch2→ADch3→ADch2→ ... ). The control unit 4103 causes the multiplexer 1100 to select an input channel and output an analog signal from the selected input channel to the A/D converter 1101, according to the determined sequential A/D conversion loop (ADch2→ADch3→ADch2→ ... ).

Thus, the A/D conversion unit 410 sequentially performs A/D conversion according to the sequential A/D conversion loop (ADch2→ADch3→ADch2→ ... ). This enables motor current detection to be performed in an A/D conversion period corresponding to two phases.

Next, the conversion prohibited channel designation register 4107 is changed to designate the input channel ADch2 as a conversion prohibited channel.

The control unit 4103 references the register unit 4104, and determines a sequential A/D conversion loop (ADch1→ADch3→ADch1→ ... ) that excludes the channel number ADch2 of the input channel ADch2 designated as a conversion prohibited channel in the conversion prohibited channel designation register 4107, from the sequential A/D conversion loop (ADch1→ADch2→ADch3→ADch1→ ... ) which has been determined by the settings of the sequential A/D conversion start channel setting register 1105 and the sequential A/D conversion end channel setting register 1106 and the setting of sequentially performing conversion in increasing order of channel number.

Thus, the A/D conversion unit 110 sequentially performs A/D conversion according to the sequential A/D conversion loop (ADch1→ADch3→ADch1→ ... ). This enables motor current detection to be performed in an A/D conversion period corresponding to two phases.

Next, the conversion prohibited channel designation register 4107 is changed to designate the input channel ADch3 as a conversion prohibited channel.

The control unit 4103 references the register unit 4104, and determines a sequential A/D conversion loop (ADch1→ADch2→ADch1→ ... ) that excludes the channel number ADch3 of the input channel ADch3 designated as a conversion prohibited channel in the conversion prohibited channel designation register 4107, from the sequential A/D conversion loop (ADch1→ADch2→ADch3→ADch1→ ... ) which has been determined by the settings of the sequential A/D conversion start channel setting register 1105 and the sequential A/D conversion end channel setting register 1106 and the setting of sequentially performing conversion in increasing order of channel number.

Thus, the A/D conversion unit 410 sequentially performs A/D conversion according to the sequential A/D conversion loop (ADch1→ADch2→ADch1→ ... ). This enables motor current detection to be performed in an A/D conversion period corresponding to two phases.

By changing the setting of the conversion prohibited channel in the conversion prohibited channel designation register 4107 according to need in this way, the A/D conversion unit 410 can perform motor current detection at successive timings.

As described above, by changing the conversion prohibited channel information shown by the conversion prohibited channel designation register 4107 according to need, the A/D conversion unit 410 can perform motor current detection in an A/D conversion period corresponding to two phases, in accordance with the determined sequential A/D conversion loop. For example, when a period required for A/D conversion in the A/D converter 1101 in the A/D conversion unit 410 is 1 μs, an A/D conversion period in the A/D converter 1101 required for the motor control microcomputer 107 to obtain the motor current values is 2 μs. Hence motor current detection can be performed in an A/D conversion period corresponding to two phases.

Moreover, when the conversion prohibited channel designation register 4107 is configured to designate the number of input channels calculated by subtracting 2 from the total number of input channels that can be subject to sequential A/D conversion, the conversion prohibited channel designation register 4107 can support all patterns of conversion prohibited channel information. Consequently, the A/D conversion unit 410 having one A/D converter in the fourth embodiment can be realized with the number of bits of register resources calculated by multiplying the number of bits, which are necessary for designating the number of input channels that are subject to sequential A/D conversion, by a result of subtraction of 2 from the total number of input channels that can be subject to sequential A/D conversion. For example, when the number of input channels that can be subject to A/D conversion is 16, the number of bits necessary for designating four input channels that are subject to sequential A/D conversion is 4 or less, so that the A/D conversion unit 410 can be realized with register resources of 56 bits or less.

Furthermore, the conversion prohibited channel designation register 4107 may designate only an input channel that is not to be selected by the multiplexer 1100, from among all input channels that can be subject to sequential A/D conversion. In this case, the A/D conversion unit 410 having one A/D converter in the fourth embodiment can be realized with the number of bits of register resources calculated by adding the number of bits necessary for designating the number of input channels that are subject to sequential A/D conversion, to the number of bits necessary for designating an input channel not to be selected by the multiplexer 1100. For example, the A/D conversion unit 410 can be realized with register resources of 4 bits, i.e., a sum of 3 bits necessary for designating the number of input channels that are subject to sequential A/D conversion and 1 bit necessary for designating an input channel not to be selected by the multiplexer 1100.

As described above, according to the fourth embodiment, an A/D conversion apparatus that reduces register resources to achieve a lower cost while minimizing the number of A/D converters can be realized.

This makes it possible to provide a motor control apparatus capable of motor current detection in an A/D conversion period corresponding to two phases out of three phases of a sinusoidal drive motor, at low cost.

Note that the setting of the sequential A/D conversion end channel setting register 1106 may be changed to increase the number of input channels that are subject to sequential A/D conversion. In this case, by inputting an analog signal for use other than motor current detection into the A/D conversion unit 410 after motor current detection, the analog signal for the other use can be detected, too.

Moreover, the sequential A/D conversion reference loop may not necessarily be determined by the sequential A/D conversion reference start channel setting register 1110 and the sequential A/D conversion reference end channel setting register 1111 in the register unit 4104. Which is to say, the registers for setting the sequential A/D conversion reference loop may be omitted. For instance, the sequential A/D conversion reference loop may be hardware-dependent, that is, may be fixed in the A/D conversion unit 410.

Fifth Embodiment

A fifth embodiment of the present invention is described below, with reference to drawings.

The fourth embodiment describes an A/D conversion apparatus that reduces register resources to achieve a lower cost while minimizing the number of A/D converters, by providing the conversion prohibited channel designation register 4107 in the A/D conversion unit 410 having one A/D converter. The fifth embodiment describes an A/D conversion apparatus that reduces register resources to achieve a lower cost while minimizing the number of A/D converters, by a different structure from the fourth embodiment.

Figure 17:
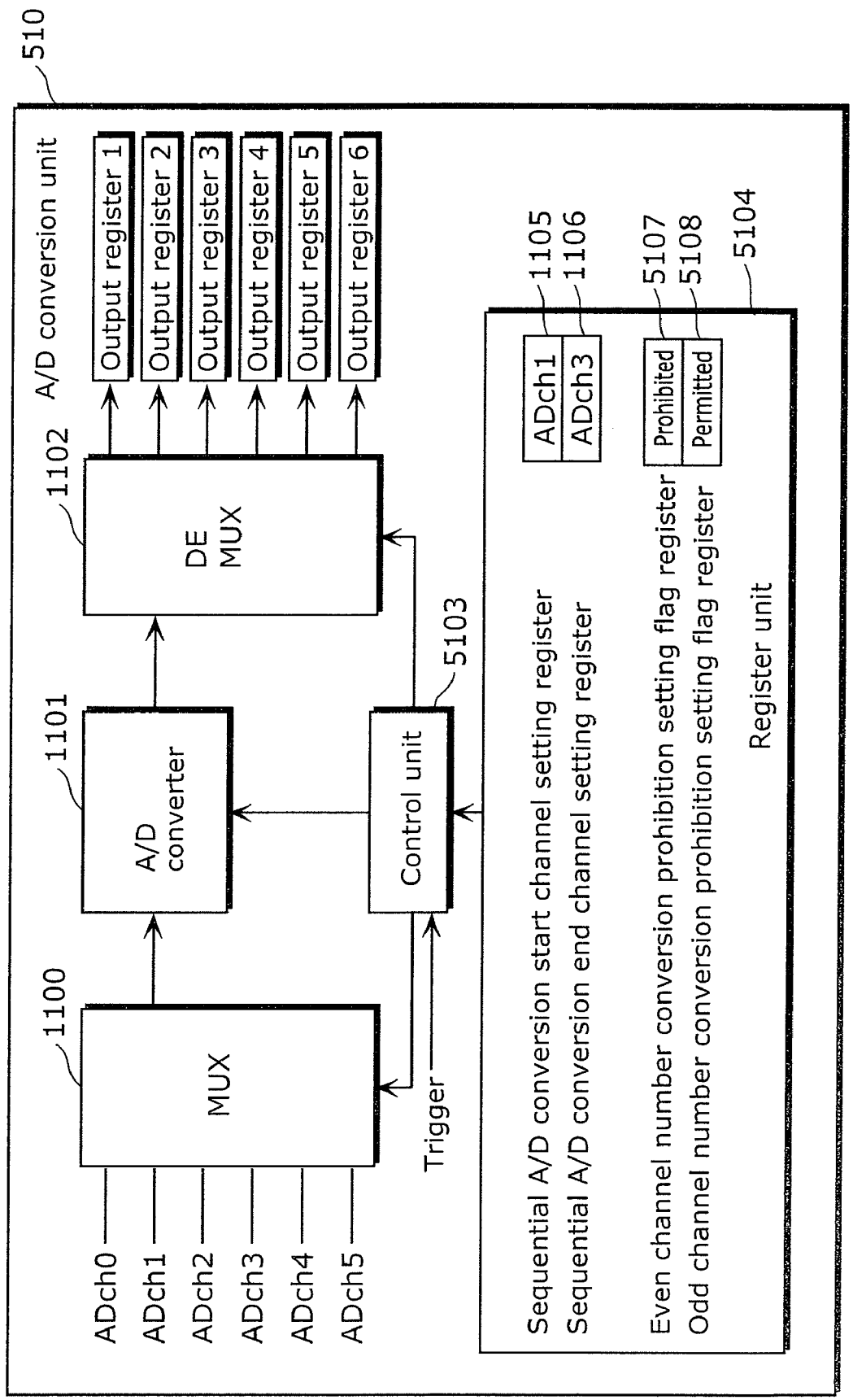
FIG. 17 is a block diagram showing a structure of an A/D conversion unit in a three-shunt sensorless sinusoidal motor drive control apparatus in a fifth embodiment of the present invention.

FIG. 17 is a block diagram showing a structure of an A/D conversion unit 510 in the three-shunt sensorless sinusoidal motor drive control apparatus 100 in the fifth embodiment. In FIG. 17, components which are the same as those in FIGS. 6, 10, 13, and 15 have been given the same reference numerals, and their detailed explanation has been omitted here.

As shown in FIG. 17, the A/D conversion unit 510 includes the plurality of input channels ADch0 to ADch5, the multiplexer 1100, the A/D converter 1101, the demultiplexer 1102, a control unit 5103, and a register unit 5104. The A/D conversion unit 510 shown in FIG. 17 differs from the A/D conversion unit 410 of the fourth embodiment, in the structures of the control unit 5103 and the register unit 5104.

The control unit 5103 references the register unit 5104, and determines an order of input channels to be selected by the multiplexer 1100. The control unit 5103 causes the multiplexer 1100 to select one of the plurality of input channels ADch0 to ADch5 and output an analog signal from the selected input channel to the A/D converter 1101, according to the determined order of input channels. The control unit 5103 causes the A/D converter 1101 to convert the analog signal from the input channel selected by the multiplexer 1100 to a digital signal, and output the digital signal to the demultiplexer 1102.

The control unit 5103 causes the demultiplexer 1102 to select one of the plurality of output registers, and output the digital signal received from the A/D converter 1101 to the selected output register.

The register unit 5104 includes the sequential A/D conversion start channel setting register 1105, the sequential A/D conversion end channel setting register 1106, an even channel number conversion prohibition setting flag register 5107, and an odd channel number conversion prohibition setting flag register 5108.

The register unit 5104 also includes the sequential A/D conversion reference start channel setting register 1110 and the sequential A/D conversion reference end channel setting register 1111 as in the first to fourth embodiments, which are used for determining a sequential A/D conversion reference loop that defines an order and range of channel numbers of input channels that can be subject to selection by the multiplexer 1100.

In addition, the control unit 5103 determines a range of channel numbers of input channels to be selected by the multiplexer 1100 in the order of channel numbers of the sequential A/D conversion reference loop, according to the sequential A/D conversion start channel setting register 1105 and the sequential A/D conversion end channel setting register 1106 in the register unit 5104. That is, the control unit 5103 determines a sequential A/D conversion loop as "sequential A/D conversion start channel→ . . . →sequential A/D conversion end channel→sequential A/D conversion start channel→ . . . ".

The even channel number conversion prohibition setting flag register 5107 holds a flag indicating whether or not, among the channel numbers of all input channels that can be subject to sequential A/D conversion, input channels of even channel numbers are not to be selected by the multiplexer 1100.

The odd channel number conversion prohibition setting flag register 5108 holds a flag indicating whether or not, among the channel numbers of all input channels that can be subject to sequential A/D conversion, input channels of odd channel numbers are not to be selected by the multiplexer 1100.

In the case when the flag held in the even channel number conversion prohibition setting flag register 5107 indicates prohibition that the input channels of the even channel numbers are not to be selected by the multiplexer 1100 and the flag held in the odd channel number conversion prohibition setting flag register 5108 indicates permission that the input channels of the odd channel numbers can be selected by the multiplexer 1100, each even channel number is excluded from the channel numbers included in the sequential A/D conversion loop determined by the settings of the sequential A/D conversion start channel setting register 1105 and the sequential A/D conversion end channel setting register 1106. That is, the control unit 5103 causes the multiplexer 1100 to select input channels in the order of channel numbers (ADch1→ADch3→ADch1→ . . . ) from a channel number, such as ADch1, set in the sequential A/D conversion start channel setting register 1105 to a channel number, such as ADch3, set in the sequential A/D conversion end channel setting register 1106, excluding each even channel number, such as ADch2, as indicated by the flag in the even channel number conversion prohibition setting flag register 5107. As a result, analog signals inputted into the selected input channels are sequentially outputted to the multiplexer 1100.

FIGS. 18A and 18B are explanatory views showing a sequential conversion operation of sequentially performing A/D conversion in the A/D conversion unit 510 in the fifth embodiment.

FIG. 18A is the same as FIGS. 8A, 11A, 14A, and 16A, and so its explanation has been omitted here. According to the setting of FIG. 18A, the sequential A/D conversion reference loop (ADch0→ADch1→ADch2→ADch3→ADch4→ADch5→ . . . ) is determined so that the A/D conversion unit 510 sequentially performs conversion in increasing order of channel number.

FIG. 18B shows a sequential conversion operation of sequentially performing A/D conversion in the A/D conversion unit 510, in the case when the sequential A/D conversion start channel setting register 1105 is set to the channel number ADch1, the sequential A/D conversion end channel setting register 1106 is set to the channel number ADch3, the flag in the even channel number conversion prohibition setting flag register 5107 is set to indicate prohibition that the input channels of the even channel numbers are not to be selected by the multiplexer 1100, and the flag in the odd channel number conversion prohibition setting flag register 5108 is set to indicate permission that the input channels of the odd channel numbers can be selected by the multiplexer 1100.

In FIG. 18B, the sequential A/D conversion start channel setting register 1105 is set to the channel number ADch1, and the sequential A/D conversion end channel setting register 1106 is set to the channel number ADch3. At this point, a sequential A/D conversion loop is determined as (ADch1→ADch2→ADch3→ADch1→ . . . ). Furthermore, by setting the flag in the even channel number conversion prohibition setting flag register 5107 to indicate prohibition and the flag in the odd channel number conversion prohibition setting flag register 5108 to indicate permission, a sequential A/D conversion loop (ADch1→ADch3→ADch1→ . . . ) that excludes the channel number ADch2 which is an even channel number is determined.

The control unit 5103 controls the multiplexer 1100 and the A/D converter 1101, according to the determined sequential A/D conversion loop (ADch1→ADch3→ADch1→ . . . ). The control unit 5103 causes the multiplexer 1100 to select an input channel and output an analog signal from the selected input channel to the A/D converter 1101, according to the determined sequential A/D conversion loop (ADch1→ADch3→ADch1→ . . . ).

In the three-shunt sensorless sinusoidal motor drive control apparatus 100 that includes the A/D conversion unit 510 having one A/D converter in the fifth embodiment, the three phase motor currents detected by the shunt resistors 108 are amplified and the amplified motor current values are inputted into the A/D conversion unit 510 as analog input signals.

It is assumed here that the analog input signals are inputted into the input channels ADch1, ADch2, and ADch3 in the A/D conversion unit 510.

The following describes a method in which the A/D conversion unit 510 having one A/D converter performs motor current detection in an A/D conversion period corresponding to two phases, in a motor current obtainment timing section during which the lower arm of the PWM signal of the motor control power module 106 is ON.

First, the sequential A/D conversion start channel setting register 1105 is set to the channel number of the input channel ADch1, and the sequential A/D conversion end channel setting register 1106 is set to the channel number of the input channel ADch2. As a result, a sequential A/D conversion loop (ADch1→ADch2→ADch1→ADch2→ . . . ) is determined.

Next, the flag held in the even channel number conversion prohibition setting flag register 5107 is set to indicate permission that the input channels of the even channel numbers can be selected by the multiplexer 1100, and the flag held in the odd channel number conversion prohibition setting flag register 5108 is set to indicate permission that the input channels of the odd channel numbers can be selected by the multiplexer 1100.

As a result, the sequential A/D conversion loop (ADch1→ADch2→ADch1→ . . . ) is determined.

The control unit 5103 causes the multiplexer 1100 to select an input channel and output an analog signal from the selected input channel to the A/D converter 1101, according to the determined sequential A/D conversion loop (ADch1→ADch2→ADch1→ . . . ).

Thus, the A/D conversion unit 510 sequentially performs A/D conversion according to the sequential A/D conversion loop (ADch1→ADch2→ADch1→ . . . ). This enables motor current detection to be performed in an A/D conversion period corresponding to two phases.

Next, the sequential A/D conversion start channel setting register 1105 is set to the channel number of the input channel ADch2, and the sequential A/D conversion end channel setting register 1106 is set to the channel number of the input channel ADch3. As a result, a sequential A/D conversion loop (ADch2→ADch3→ADch2→ADch3→ . . . ) is determined.

Here, the flag held in the even channel number conversion prohibition setting flag register 5107 is set to indicate permission that the input channels of the even channel numbers can be selected by the multiplexer 1100, and the flag held in the odd channel number conversion prohibition setting flag register 5108 is set to indicate permission that the input channels of the odd channel numbers can be selected by the multiplexer 1100.

As a result, the sequential A/D conversion loop (ADch2→ADch3→ADch2→ADch3→ . . . ) is determined.

The control unit 5103 causes the multiplexer 1100 to select an input channel and output an analog signal from the selected input channel to the A/D converter 1101, according to the determined sequential A/D conversion loop (ADch2→ADch3→ADch2→ADch3→ . . . ).

Thus, the A/D conversion unit 510 sequentially performs A/D conversion according to the sequential A/D conversion loop (ADch2→ADch3→ADch2→ADch3→ . . . ). This enables motor current detection to be performed in an A/D conversion period corresponding to two phases.

Next, the sequential A/D conversion start channel setting register 1105 is set to the channel number of the input channel ADch1, and the sequential A/D conversion end channel setting register 1106 is set to the channel number of the input channel ADch3. As a result, a sequential A/D conversion loop (ADch1→ADch2→ADch3→ADch1→ . . . ) is determined.

Here, the flag held in the even channel number conversion prohibition setting flag register 5107 is set to indicate prohibition that the input channels of the even channel numbers are not to be selected by the multiplexer 1100, and the flag held in the odd channel number conversion prohibition setting flag register 5108 is set to indicate permission that the input channels of the odd channel numbers can be selected by the multiplexer 1100.

As a result, a sequential A/D conversion loop (ADch1→ADch3→ADch1→ . . . ) excluding the channel number ADch2 which is an even channel number is determined.

The control unit 5103 causes the multiplexer 1100 to select an input channel and output an analog signal from the selected input channel to the A/D converter 1101, according to the determined sequential A/D conversion loop (ADch1→ADch3→ADch1→ADch3→ . . . ).

Thus, the A/D conversion unit 510 sequentially performs A/D conversion according to the sequential A/D conversion loop (ADch1→ADch3→ADch1→ADch3→ . . . ). This enables motor current detection to be performed in an A/D conversion period corresponding to two phases.

In this way, by changing the channel numbers of the sequential A/D conversion start channel setting register 1105 and the sequential A/D conversion end channel setting register 1106 and the settings of the flags held in the even channel number conversion prohibition setting flag register 5107 and the odd channel number conversion prohibition setting flag register 5108 according to need, the A/D conversion unit 510 can perform motor current detection at successive timings.

As described above, by changing the channel numbers of the sequential A/D conversion start channel setting register 1105 and the sequential A/D conversion end channel setting register 1106 and the settings of the flags held in the even channel number conversion prohibition setting flag register 5107 and the odd channel number conversion prohibition setting flag register 5108 according to need, the A/D conversion unit 510 can perform motor current detection in an A/D conversion period corresponding to two phases, in accordance with the determined sequential A/D conversion loop. For example, when a period required for A/D conversion in the A/D converter 1101 in the A/D conversion unit 510 is 1 μs, an A/D conversion period in the A/D converter 1101 required for the motor control microcomputer 107 to obtain the motor current values is 2 μs. Hence motor current detection can be performed in an A/D conversion period corresponding to two phases.

Moreover, by defining, for example, "1" as prohibition and "0" as permission in each of the flags held in the even channel number conversion prohibition setting flag register 5107 and the odd channel number conversion prohibition setting flag register 5108, it is possible to indicate whether or not A/D conversion is prohibited, using a 1-bit register resource. This allows the A/D conversion unit 510 having one A/D converter in the fifth embodiment to be realized with register resources of 2 bits corresponding to two flags.

As described above, according to the fifth embodiment, an A/D conversion apparatus that reduces register resources to achieve a lower cost while minimizing the number of A/D converters can be realized.

This makes it possible to provide a motor control apparatus capable of motor current detection in an A/D conversion period corresponding to two phases out of three phases of a sinusoidal drive motor, at low cost.

Note that the setting of the sequential A/D conversion end channel setting register 1106 may be changed to increase the number of input channels that are subject to sequential A/D conversion. In this case, by inputting an analog signal for use other than motor current detection into the A/D conversion unit 510 after motor current detection, the analog signal for the other use can be detected, too.

Moreover, the sequential A/D conversion reference loop may not necessarily be determined by the sequential A/D conversion reference start channel setting register 1110 and the sequential A/D conversion reference end channel setting register 1111 in the register unit 5104. Which is to say, the registers for setting the sequential A/D conversion reference loop may be omitted. For instance, the sequential A/D conversion reference loop may be hardware-dependent, that is, may be fixed in the A/D conversion unit 510.

Sixth Embodiment

A sixth embodiment of the present invention is described below, with reference to drawings.

The fifth embodiment describes an A/D conversion apparatus that reduces register resources to achieve a lower cost while minimizing the number of A/D converters, by providing the even channel number conversion prohibition setting flag register 5107 and the odd channel number conversion prohibition setting flag register 5108 in the A/D conversion unit 510 having one A/D converter. The sixth embodiment describes an A/D conversion apparatus that reduces register resources to achieve a lower cost while minimizing the number of A/D converters, by a different structure from the fifth embodiment.

Figure 19:
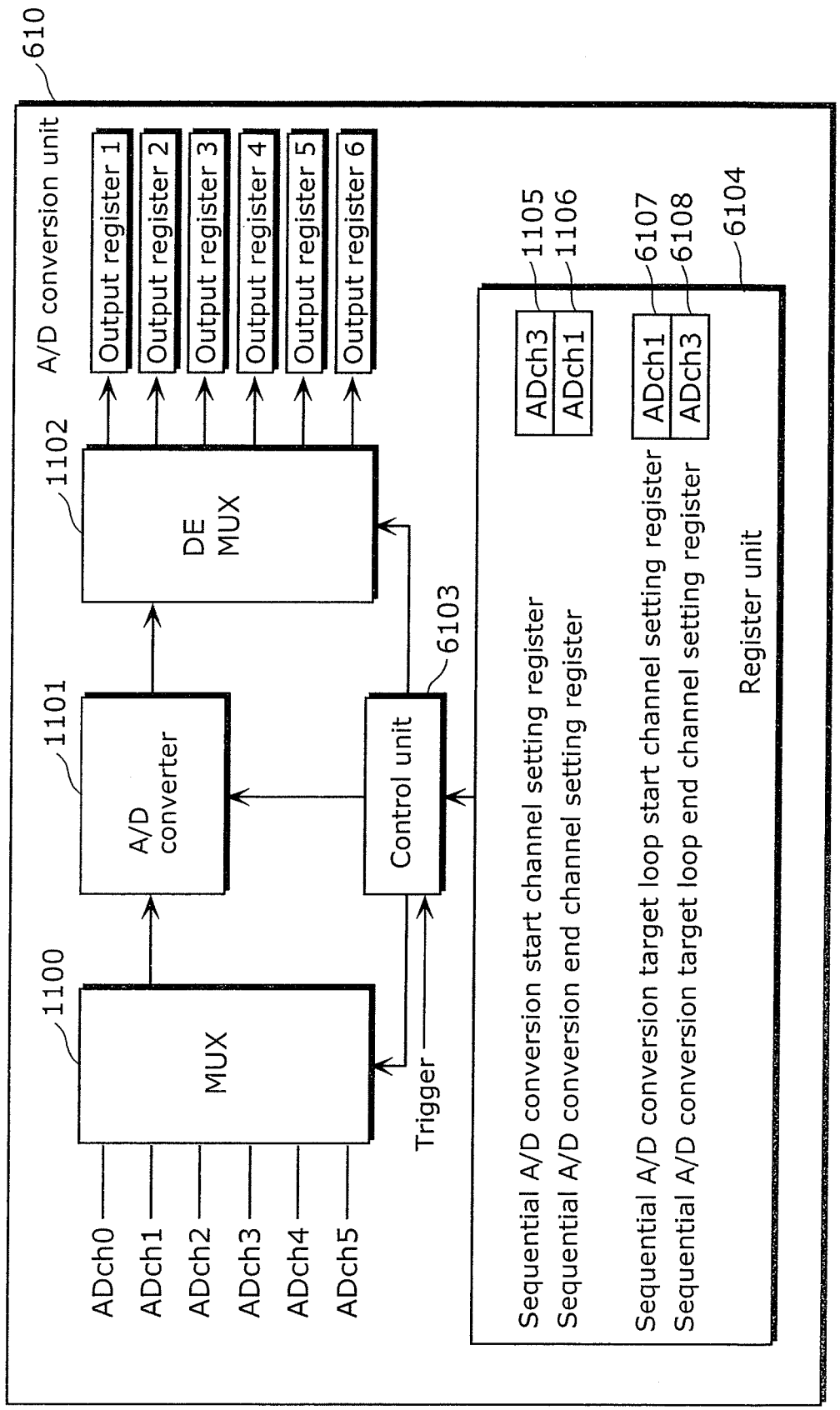
FIG. 19 is a block diagram showing a structure of an A/D conversion unit in a three-shunt sensorless sinusoidal motor drive control apparatus in a sixth embodiment of the present invention.

FIG. 19 is a block diagram showing a structure of an A/D conversion unit 610 in the three-shunt sensorless sinusoidal motor drive control apparatus 100 in the sixth embodiment. In FIG. 19, components which are the same as those in FIGS. 6, 10, 13, 15, and 17 have been given the same reference numerals, and their detailed explanation has been omitted here.

As shown in FIG. 19, the A/D conversion unit 610 includes the plurality of input channels ADch0 to ADch5, the multiplexer 1100, the A/D converter 1101, the demultiplexer 1102, a control unit 6103, and a register unit 6104. The A/D conversion unit 610 shown in FIG. 19 differs from the A/D conversion unit 510 of the fifth embodiment, in the structures of the control unit 6103 and the register unit 6104.

The control unit 6103 references the register unit 6104, and determines an order of input channels to be selected by the multiplexer 1100. The control unit 6103 causes the multiplexer 1100 to select one of the plurality of input channels ADch0 to ADch5 and output an analog signal from the selected input channel to the A/D converter 1101, according to the determined order of input channels. The control unit 6103 causes the A/D converter 1101 to convert the analog signal from the input channel selected by the multiplexer 1100 to a digital signal, and output the digital signal to the demultiplexer 1102.

The control unit 6103 causes the demultiplexer 1102 to select one of the plurality of output registers, and output the digital signal received from the A/D converter 1101 to the selected output register.

The register unit 6104 includes the sequential A/D conversion start channel setting register 1105, the sequential A/D conversion end channel setting register 1106, a sequential A/D conversion target loop start channel setting register 6107, and a sequential A/D conversion target loop end channel setting register 6108.

The register unit 6104 also includes the sequential A/D conversion reference start channel setting register 1110 and the sequential A/D conversion reference end channel setting register 1111 as in the first to fifth embodiments, which are used for determining a sequential A/D conversion reference loop that defines an order and range of channel numbers of input channels that can be subject to selection by the multiplexer 1100.

In addition, the control unit 6103 determines a range of channel numbers of input channels to be selected by the multiplexer 1100 in the order of channel numbers of the sequential A/D conversion reference loop, according to the sequential A/D conversion start channel setting register 1105 and the sequential A/D conversion end channel setting register 1106 in the register unit 6104. That is, the control unit 6103 determines a sequential A/D conversion loop as "sequential A/D conversion start channel→ ... →sequential A/D conversion end channel→sequential A/D conversion start channel→ ... ".

The sequential A/D conversion target loop start channel setting register 6107 and the sequential A/D conversion target loop end channel setting register 6108 are used to determine, as another sequential A/D conversion loop, an order and range of channel numbers of input channels that can be selected by the multiplexer 1100 (hereafter referred to as "sequential A/D conversion target loop").

In detail, according to the sequential A/D conversion target loop start channel setting register 6107 and the sequential A/D conversion target loop end channel setting register 6108 in the register unit 6104, a range of channel numbers of input channels to be selected by the multiplexer 1100 in an order of channel numbers of a sequential A/D conversion target loop is determined by the control unit 6103. Which is to say, the control unit 6103 determines a sequential A/D conversion target loop as "sequential A/D conversion target loop start channel→ ... →sequential A/D conversion target loop end channel→sequential A/D conversion target loop start channel→ ... ".

The control unit 6103 references the register unit 6104, and determines the order of channel numbers of the sequential A/D conversion target loop, according to the settings of the sequential A/D conversion target loop start channel setting register 6107 and the sequential A/D conversion target loop end channel setting register 6108. The control unit 6103 then excludes, from the order of channel numbers of the sequential A/D conversion loop determined by the settings of the sequential A/D conversion start channel setting register 1105 and the sequential A/D conversion end channel setting register 1106, each channel number that is not designated in the order of channel numbers of the sequential A/D conversion target loop. That is, the control unit 6103 determines a sequential A/D conversion loop (ADch3→ADch1→ADch3→ ... ) that excludes each channel number not designated in a sequential A/D conversion target loop (ADch1→ADch2→ADch3→ADch1→ ... ) from a channel number, such as ADch1, set in the sequential A/D conversion target loop start channel setting register 6107 to a channel number, such as ADch3, set in the sequential A/D conversion target loop end channel setting register 6108, from a sequential A/D conversion loop (ADch3→ADch4→ADch5→ADch0→ADch1→ADch3→ ... ) from a channel number, such as ADch3, set in the sequential A/D conversion start channel setting register 1105 to a channel number, such as ADch1, set in the sequential A/D conversion end channel setting register 1106. The control unit 6103 causes the multiplexer 1100 to select input channels of the channel numbers in the determined sequential A/D conversion loop (ADch3→ADch1→ADch3→ ... ), in channel number order. As a result, analog signals inputted into the selected input channels are sequentially outputted to the multiplexer 1100.

Figure 20:
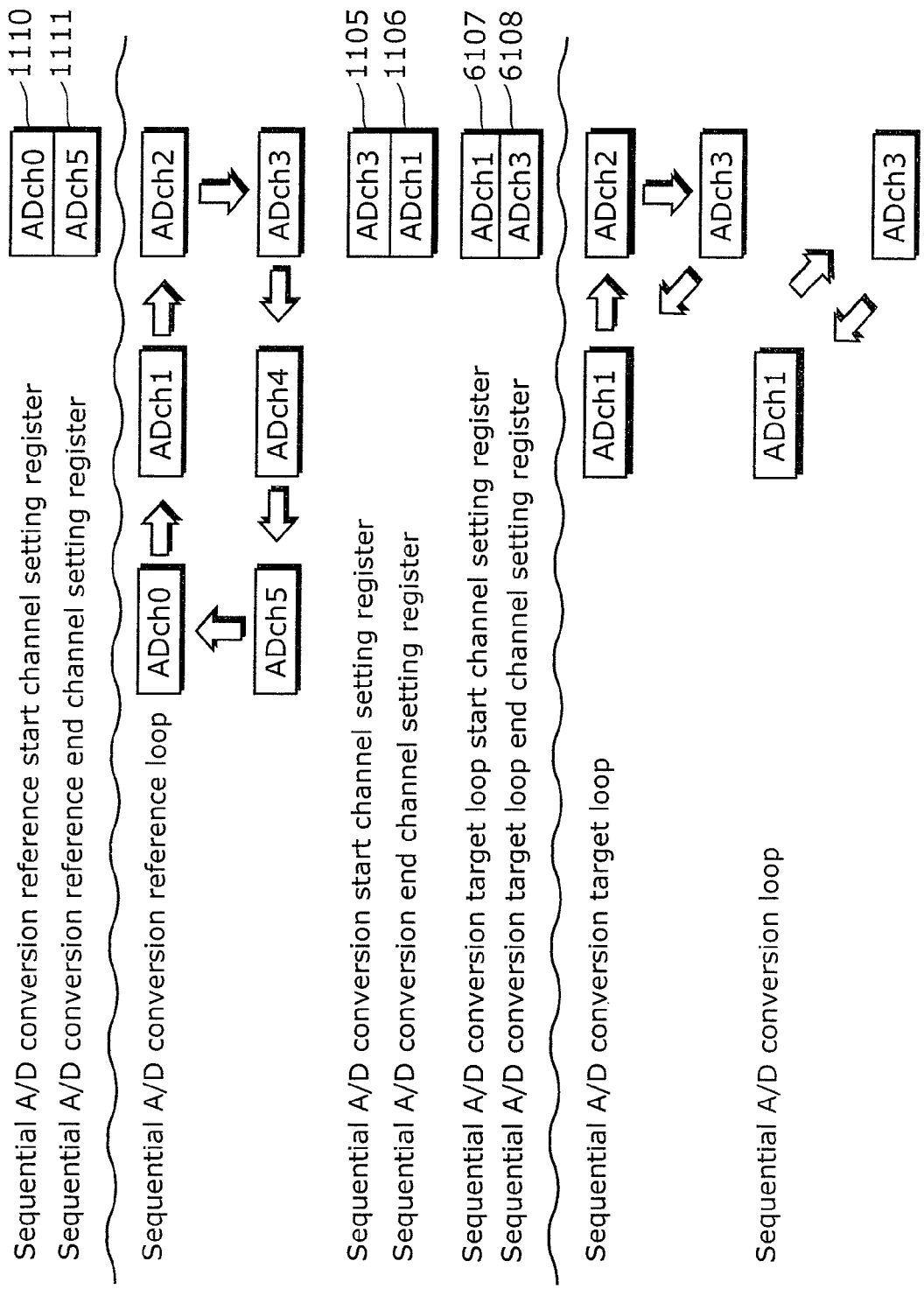
FIGS. 20A and 20B are explanatory views showing a sequential conversion operation of sequentially performing A/D conversion in the A/D conversion unit in the sixth embodiment of the present invention.

FIGS. 20A and 20B are explanatory views showing a sequential conversion operation of sequentially performing A/D conversion in the A/D conversion unit 610 in the sixth embodiment.

FIG. 20A is the same as those in the first to fifth embodiments, and so its explanation has been omitted here. According to the setting of FIG. 20A, the sequential A/D conversion reference loop (ADch0→ADch1→ADch2→ADch3→ADch4→ADch5→ ... ) is determined so that the A/D conversion unit 610 sequentially performs conversion in increasing order of channel number.

FIG. 20B shows a sequential conversion operation of sequentially performing A/D conversion in the A/D conversion unit 610, in the case when the sequential A/D conversion start channel setting register 1105 is set to the channel number ADch3, the sequential A/D conversion end channel setting register 1106 is set to the channel number ADch1, the sequential A/D conversion target loop start channel setting register 6107 is set to the channel number ADch1, and the sequential A/D conversion target loop end channel setting register 6107 is set to the channel number ADch3.

In FIG. 20B, the sequential A/D conversion start channel setting register 1105 is set to the channel number ADch3, and the sequential A/D conversion end channel setting register 1106 is set to the channel number ADch1. At this point, a sequential A/D conversion loop is determined as (ADch3→ADch4→ADch5→ADch0→ADch1→ADch3→ ... ). By further setting the sequential A/D conversion target loop start channel setting register 6107 to the channel number ADch1 and the sequential A/D conversion target loop end channel setting register 6108 to the channel number ADch3, the channel numbers ADch0, ADch4, and ADch5 which are not designated in a sequential A/D conversion target loop (ADch1→ADch2→ADch3→ ... ) are excluded from the sequential A/D conversion loop (ADch3→ADch4→ADch5→ADch0→ADch1→ADch3→ ... ). As a result, a sequential A/D conversion loop (ADch3→ADch1→ADch3→ ... ) is determined.

The control unit 6103 controls the multiplexer 1100 and the A/D converter 1101, according to the determined sequential A/D conversion loop (ADch3→ADch1→ADch3→ ... ). The control unit 6103 causes the multiplexer 1100 to select an input channel and output an analog signal from the selected input channel to the A/D converter 1101, according to the determined sequential A/D conversion loop (ADch3→ADch1→ADch3→ . . . ).

In the three-shunt sensorless sinusoidal motor drive control apparatus 100 that includes the A/D conversion unit 610 having one A/D converter in the sixth embodiment, the three phase motor currents detected by the shunt resistors 108 are amplified and the amplified motor current values are inputted into the A/D conversion unit 610 as analog input signals.

It is assumed here that the analog input signals are inputted into the input channels ADch1, ADch2, and ADch3 in the A/D conversion unit 610.

The following describes a method in which the A/D conversion unit 610 having one A/D converter performs motor current detection in an A/D conversion period corresponding to two phases, in a motor current obtainment timing section during which the lower arm of the PWM signal of the motor control power module 106 is ON.

First, the sequential A/D conversion target loop start channel setting register 6107 is set to the channel number of the input channel ADch1, and the sequential A/D conversion target loop end channel setting register 6108 is set to the channel number of the input channel ADch3. As a result, a sequential A/D conversion target loop (ADch1→ADch2→ADch3→ADch1→ . . . ) is determined.

Next, the sequential A/D conversion start channel setting register 1105 is set to the channel number of the input channel ADch1, and the sequential A/D conversion end channel setting register 1106 is set to the channel number of the input channel ADch2. As a result, a sequential A/D conversion loop (ADch1→ADch2→ADch1→ADch2→ . . . ) is determined.

Each channel number not designated in the sequential A/D conversion target loop (ADch1→ADch2→ADch3→ADch1→ . . . ) is excluded from the sequential A/D conversion loop (ADch1→ADch2→ADch1→ADch2→ . . . ), as a result of which the sequential A/D conversion loop (ADch1→ADch2→ADch1→ . . . ) is determined. In this case, there is no channel number that is not designated in the sequential A/D conversion target loop, in the sequential A/D conversion loop. Therefore, the sequential A/D conversion loop is determined as (ADch1→ADch2→ADch1→ . . . ).

The control unit 6103 causes the multiplexer 1100 to select an input channel and output an analog signal from the selected input channel to the A/D converter 1101, according to the determined sequential A/D conversion loop (ADch1→ADch2→ADch1→ . . . ).

Thus, the A/D conversion unit 610 sequentially performs A/D conversion according to the sequential A/D conversion loop (ADch1→ADch2→ADch1→ . . . ). This enables motor current detection to be performed in an A/D conversion period corresponding to two phases.

Next, the sequential A/D conversion start channel setting register 1105 is set to the channel number of the input channel ADch2, and the sequential A/D conversion end channel setting register 1106 is set to the channel number of the input channel ADch3. As a result, a sequential A/D conversion loop (ADch2→ADch3→ADch2→ADch3→ . . . ) is determined.

Here, the sequential A/D conversion target loop start channel setting register 6107 is set to the channel number of the input channel ADch1, and the sequential A/D conversion target loop end channel setting register 6108 is set to the channel number of the input channel ADch3, as in the above case. As a result, the sequential A/D conversion target loop (ADch1→ADch2→ADch3→ADch1→ . . . ) is determined.

Each channel number not designated in the sequential A/D conversion target loop (ADch1→ADch2→ADch3→ADch1→ . . . ) is excluded from the sequential A/D conversion loop (ADch2→ADch3→ADch2→ADch3→ . . . ), as a result of which the sequential A/D conversion loop (ADch2→ADch3→ADch2→ . . . ) is determined. In this case, there is no channel number that is not designated in the sequential A/D conversion target loop, in the sequential A/D conversion loop. Therefore, the sequential A/D conversion loop is determined as (ADch2→ADch3→ADch2→ . . . ).

Thus, the A/D conversion unit 610 sequentially performs A/D conversion according to the sequential A/D conversion loop (ADch2→ADch3→ADch2→ . . . ). This enables motor current detection to be performed in an A/D conversion period corresponding to two phases.

Next, the sequential A/D conversion start channel setting register 1105 is set to the channel number of the input channel ADch3, and the sequential A/D conversion end channel setting register 1106 is set to the channel number of the input channel ADch1. As a result, a sequential A/D conversion loop (ADch3→ADch4→ADch5→ADch0→ADch1→ADch3→ . . . ) is determined.

Here, the sequential A/D conversion target loop start channel setting register 6107 is set to the channel number of the input channel ADch1, and the sequential A/D conversion target loop end channel setting register 6108 is set to the channel number of the input channel ADch3, as in the above case. As a result, the sequential A/D conversion target loop (ADch1→ADch2→ADch3→ADch1→ . . . ) is determined.

The channel numbers ADch0, ADch4, and ADch5 which are not designated in the sequential A/D conversion target loop (ADch1→ADch2→ADch3→ADch1→ . . . ) are excluded from the sequential A/D conversion loop (ADch3→ADch4→ADch5→ADch0→ADch1→ADch3→ . . . ), as a result of which a sequential A/D conversion loop (ADch3→ADch1→ADch3→ . . . ) is determined.

Thus, the A/D conversion unit 610 sequentially performs A/D conversion according to the sequential A/D conversion loop (ADch3→ADch1→ADch3→ . . . ). This enables motor current detection to be performed in an A/D conversion period corresponding to two phases.

In this way, by changing the channel numbers in the sequential A/D conversion start channel setting register 1105 and the sequential A/D conversion end channel setting register 1106 and the channel numbers in the sequential A/D conversion target loop start channel setting register 6107 and the sequential A/D conversion target loop end channel setting register 6108 according to need, the A/D conversion unit 610 can perform motor current detection at successive timings.

As described above, by changing the channel numbers in the sequential A/D conversion start channel setting register 1105 and the sequential A/D conversion end channel setting register 1106 and the channel numbers in the sequential A/D conversion target loop start channel setting register 6107 and the sequential A/D conversion target loop end channel setting register 6108 according to need, the A/D conversion unit 610 can perform motor current detection in an A/D conversion period corresponding to two phases, in accordance with the determined sequential A/D conversion loop. For example, when a period required for A/D conversion in the A/D converter 1101 in the A/D conversion unit 610 is 1 µs, an A/D conversion period in the A/D converter 1101 required for the motor control microcomputer 107 to obtain the motor current values is 2 µs. Hence motor current detection can be performed in an A/D conversion period corresponding to two phases.

The A/D conversion unit 610 having one A/D converter in the sixth embodiment can be realized with the number of bits of register resources necessary for designating two input channels in the sequential A/D conversion target loop start channel setting register 6107 and the sequential A/D conversion target loop end channel setting register 6108. For example, when the number of all input channels that can be subject to A/D conversion in the A/D conversion unit 610 is 16, the A/D conversion unit 610 can be realized with register resources of 8 bits.

As described above, according to the sixth embodiment, an A/D conversion apparatus that reduces register resources to achieve a lower cost while minimizing the number of A/D converters can be realized.

This makes it possible to provide a motor control apparatus capable of motor current detection in an A/D conversion period corresponding to two phases out of three phases of a sinusoidal drive motor, at low cost.

Note that the sequential A/D conversion reference loop may not necessarily be determined by the sequential A/D conversion reference start channel setting register 1110 and the sequential A/D conversion reference end channel setting register 1111 in the register unit 6104. Which is to say, the registers for setting the sequential A/D conversion reference loop may be omitted. For instance, the sequential A/D conversion reference loop may be hardware-dependent, that is, may be fixed in the A/D conversion unit 610.

Seventh Embodiment

A seventh embodiment of the present invention is described below, with reference to drawings.

The first to sixth embodiments describe an A/D conversion apparatus that can perform motor current detection in an A/D conversion period corresponding to two phases out of three phases of a sinusoidal drive motor, with one A/D converter and reduced register resources. The seventh embodiment describes a washing machine as an example product that can be realized using the three-shunt sensorless sinusoidal motor drive control apparatus 100 including the A/D conversion apparatus of any of the first to sixth embodiments.

Figure 21:
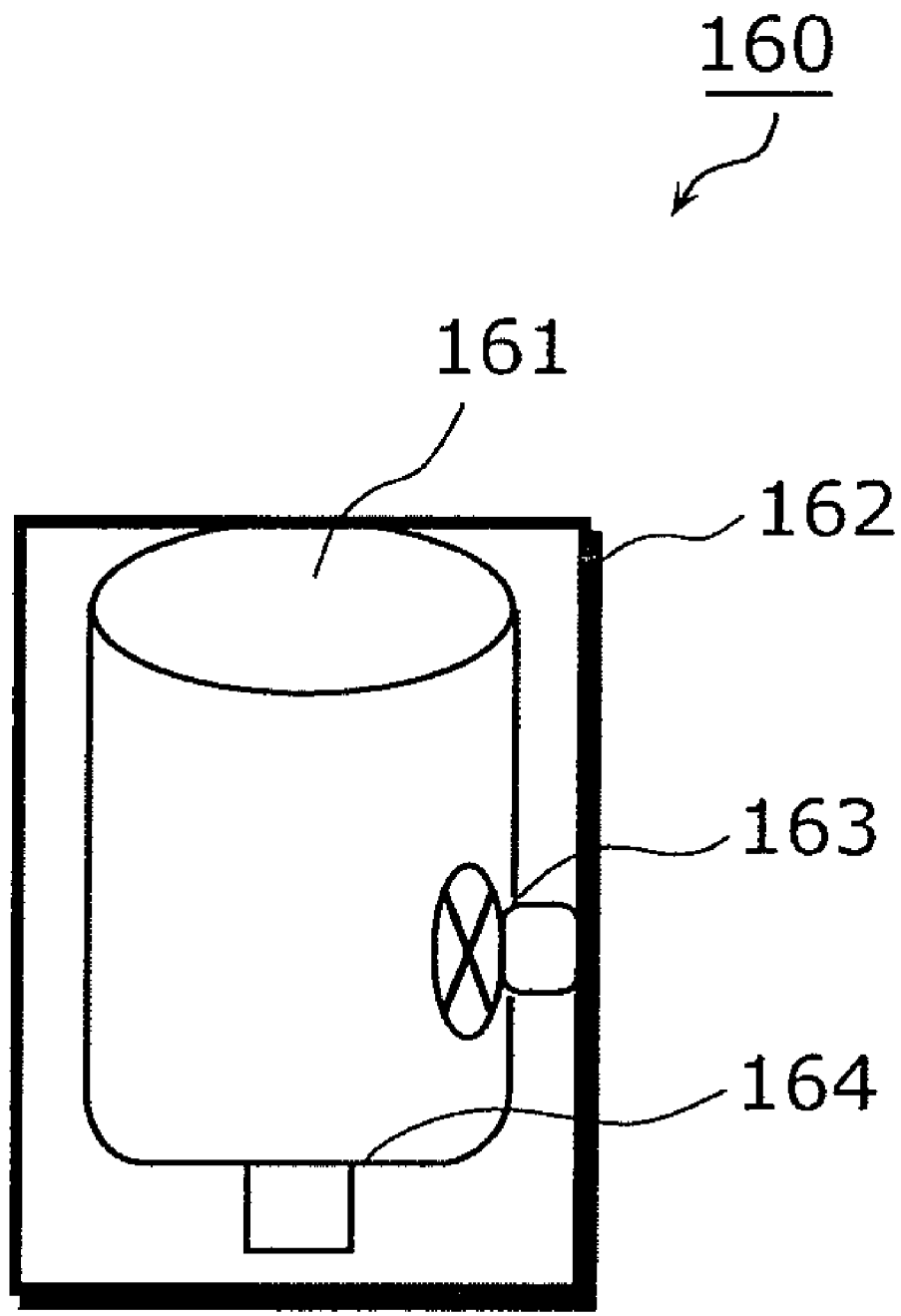
FIG. 21 shows a structure of a washing machine in a seventh embodiment of the present invention.

FIG. 21 shows a structure of a washing machine 160 which is realized using the three-shunt sensorless sinusoidal motor drive control apparatus 100 having the A/D conversion unit of any of the first to sixth embodiments.

As shown in FIG. 21, the washing machine 160 includes a washing tub 161, an enclosure 162 surrounding the washing tub 161, a fan motor 163 that feeds air into the washing tub 161, a motor 164 that rotates the washing tub 161, and a washing machine microcomputer unit that controls the two motors, namely, the fan motor 163 and the motor 164.

The washing machine microcomputer unit includes any of the A/D conversion units 110 to 610 described in the first to sixth embodiments. The washing machine microcomputer unit controls the two motors of the fan motor 163 and the motor 164, based on analog input values inputted into the A/D converter 1101 in any of the A/D conversion units 110 to 610.

For example, the analog input values inputted into the A/D converter 1101 are current values detected as motor currents of the fan motor 163 or the motor 164. In detail, the motor currents of the fan motor 163 or the motor 164 are detected by amplifying currents flowing through the three shunt resistors 108 by the motor current amplification circuit 109, inputting the amplified current values into the motor control microcomputer 107, and converting the amplified current values inputted into the A/D conversion unit in the motor control microcomputer 107 from analog to digital.

A motor position (speed) is estimated from the motor currents of the fan motor 163 or the motor 164, and a three-phase PWM signal for controlling the fan motor 163 or the motor 164 so that its motor current is sinusoidal is outputted based on the estimated motor position and a target speed. The fan motor 163 or the motor 164 is controlled in this way.

By repeating the control operation as described above, the three-shunt sensorless sinusoidal motor drive control apparatus 100 including the A/D conversion unit of any of the first to sixth embodiments can create a desired motor drive state for the fan motor 163 or the motor 164 in the washing machine 160.

As the variety of functions of washing machines has increased in recent years, many washing machines today are provided with a plurality of motors as shown in FIG. 21. In addition, against the backdrop of the cost reduction demand, there is a growing need for simultaneously controlling a plurality of motors using one A/D converter, rather than providing one A/D converter for one motor. However, the conventional motor drive control methods have the problems described earlier.

In view of this, according to the seventh embodiment, the three-shunt sensorless sinusoidal motor drive control apparatus 100 including the A/D conversion unit of any of the first to sixth embodiments is provided in the washing tub 161, with it being possible to solve the conventional problems and meet the cost reduction demand.

Note here that the plurality of motors may also include a compressor, a feed-water pump, and the like.

As described above, according to the seventh embodiment, the washing machine 160 is provided with the A/D conversion unit of any of the first to sixth embodiments, i.e., an A/D conversion apparatus that reduces register resources to achieve a lower cost while minimizing the number of A/D converters. Hence the washing machine 160 having a motor control apparatus that is capable of motor current detection in an A/D conversion period corresponding two phases out of three phases of a sinusoidal drive motor can be realized at low cost.

Although the present invention has been described by way of the above embodiments, the present invention should not be limited to the above. Any variations that can be conceived by a person skilled in the art may be applied to the above embodiments, and the components in the different embodiments may be combined freely. These structures are included in the scope of the present invention, too.

The above embodiments describe the case where the motor drive control apparatus is a sinusoidal drive type, but the present invention is not limited to this. The present invention is equally applicable to a square-wave motor drive control apparatus.

Figure 22:
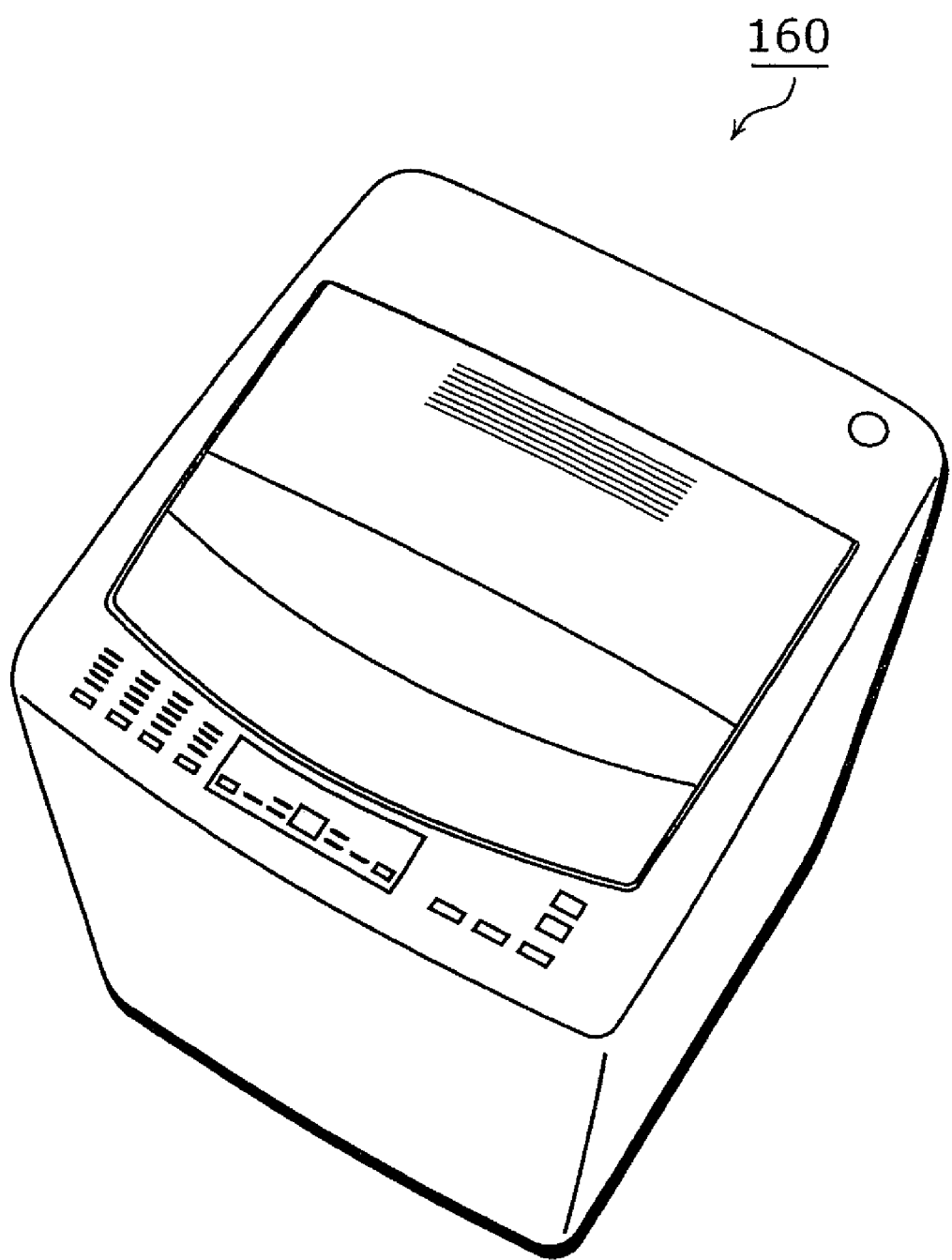
FIG. 22 shows an appearance of the washing machine.

The present invention can be used for an A/D conversion apparatus having a sequential A/D conversion function. In particular, the present invention can be used for an A/D conversion apparatus equipped in a motor drive control apparatus of, for example, a washing machine having various functions as shown in FIG. 22.

What is claimed is:

1. An analog-to-digital (A/D) conversion apparatus that has a plurality of analog input channels, and sequentially converts analog signals inputted into the plurality of analog input channels to digital signals in channel number order of a plurality of channel numbers respectively assigned to the plurality of analog input channels, said A/D conversion apparatus comprising:

a selection unit configured to select one of the plurality of analog input channels;

an A/D converter that converts an analog signal inputted into the analog input channel selected by said selection unit, to a digital signal;

a start register that holds a start channel number which is a channel number of a start analog input channel of the sequential conversion;

an end register that holds an end channel number which is a channel number of an end analog input channel of the sequential conversion;

a prohibition information holding unit configured to hold prohibition information indicating an analog input channel that is to be excluded from the sequential conversion; and a control unit configured to cause said selection unit to select, in the channel number order, analog input channels corresponding to channel numbers from the start channel number to the end channel number except the analog input channel indicated by the prohibition information held in said prohibition information holding unit.

2. The A/D conversion apparatus according to claim 1, wherein said prohibition information holding unit includes a flag register that holds a flag indicating either prohibition or permission for each of the plurality of channel numbers, as the prohibition information.

3. The A/D conversion apparatus according to claim 2, wherein said control unit is further configured to start the sequential conversion in response to each of a plurality of trigger signals, said prohibition information holding unit includes a plurality of flag registers corresponding to the plurality of trigger signals, each of said plurality of flag registers holds a flag indicating either prohibition or permission for each of the plurality of channel numbers, as the prohibition information, and said control unit is configured to, when one of the plurality of trigger signals is inputted, cause said selection unit to select, in the channel number order, analog input channels corresponding to channel numbers from the start channel number to the end channel number except an analog input channel indicated by the prohibition information held in a flag register corresponding to the inputted trigger signal.

4. The A/D conversion apparatus according to claim 1, wherein said prohibition information holding unit includes a flag register that holds a flag indicating either prohibition or permission for all channel numbers other than the start channel number and the end channel number, as the prohibition information.

5. The A/D conversion apparatus according to claim 1, wherein said prohibition information holding unit includes a prohibition register that holds a channel number of the analog input channel that is to be excluded from the sequential conversion, as the prohibition information.

6. The A/D conversion apparatus according to claim 5, wherein said prohibition register holds only one channel number, and said prohibition information holding unit includes only one prohibition register.

7. The A/D conversion apparatus according to claim 1, wherein said prohibition information holding unit includes:

an even channel prohibition register that holds a flag indicating either prohibition or permission for even channel numbers of the plurality of channel numbers, as the prohibition information; and an odd channel prohibition register that holds a flag indicating either prohibition or permission for odd channel numbers of the plurality of channel numbers, as the prohibition information, and said control unit is configured to cause said selection unit to select, in the channel number order:

analog input channels corresponding to channel numbers from the start channel number to the end channel number except each analog input channel whose channel number is even, when the flag held in said even channel prohibition register indicates prohibition; and analog input channels corresponding to channel numbers from the start channel number to the end channel number except each analog input channel whose channel number is odd, when the flag held in said odd channel prohibition register indicates prohibition.

8. The A/D conversion apparatus according to claim 1, wherein said prohibition information holding unit includes a start and end channel register that holds a first channel number and a second channel number as the prohibition information, the first channel number and the second channel number respectively being a channel number of a start analog input channel and a channel number of an end analog input channel of another sequential conversion, and said control unit is configured to cause said selection unit to select, in the channel number order, analog input channels corresponding to channel numbers from the start channel number to the end channel number, except each analog input channel whose channel number is not designated in the other sequential conversion from the first channel number to the second channel number held in said start and end channel register.

9. A washing machine comprising:

a motor that controls a washing tub; and a microcomputer that controls said motor, wherein said microcomputer includes said A/D conversion apparatus according to any of claims 1 to 8, estimates a rotor position of said motor from an analog signal obtained in said A/D conversion apparatus, and controls said motor according to the estimated rotor position.

10. A control method for controlling an A/D conversion apparatus that has a plurality of analog input channels, and sequentially converts analog signals inputted into the plurality of analog input channels to digital signals in channel number order of a plurality of channel numbers respectively assigned to the plurality of analog input channels, the A/D conversion apparatus including:

a selection unit configured to select one of the plurality of analog input channels;

an A/D converter that converts an analog signal inputted into the analog input channel selected by the selection unit, to a digital signal;

a start register that holds a start channel number which is a channel number of a start analog input channel of the sequential conversion;

an end register that holds an end channel number which is a channel number of an end analog input channel of the sequential conversion; and a prohibition information holding register that holds prohibition information indicating an analog input channel that is to be excluded from the sequential conversion, said control method comprising:

reading the start channel number, the end channel number, and the prohibition information indicating the analog input channel that is to be excluded from the sequential conversion; and causing the selection unit to select, in the channel number order, analog input channels corresponding to channel numbers from the start channel number to the end channel number except the analog input channel indicated by the prohibition information.

* * * * *